United States Patent [19]
Bohm et al.

[11] Patent Number: 5,982,780
[45] Date of Patent: Nov. 9, 1999

[54] RESOURCE MANAGEMENT SCHEME AND ARRANGEMENT

[75] Inventors: Christer Bohm, Stockholm; Lars Ramfelt, Kista; Per Lindgren, Stockholm; Markus Hidell, Lidingö; Peter Sjödin, Uppsala, all of Sweden

[73] Assignee: Dynarc AB, Kista, Sweden

[21] Appl. No.: 08/773,966

[22] Filed: Dec. 26, 1996

[30] Foreign Application Priority Data

Dec. 28, 1995 [SE] Sweden .................................. 9504681

[51] Int. Cl.⁶ .......................................................... H04J 3/00
[52] U.S. Cl. .......................................... 370/450; 370/458
[58] Field of Search .................................... 370/355, 357, 370/360, 375, 376, 377, 442, 443, 447, 458, 459, 460, 461, 462, 468, 449, 450, 451, 452, 454

[56] References Cited

U.S. PATENT DOCUMENTS

| | | | |
|---|---|---|---|
| 4,530,092 | 7/1985 | Hafer | 370/376 |
| 4,538,147 | 8/1985 | Grow | 340/825.05 |
| 4,553,234 | 11/1985 | Brandsma et al. | 370/458 |
| 4,736,371 | 4/1988 | Tejima et al. | 370/236 |
| 4,763,320 | 8/1988 | Rudolph et al. | 370/221 |
| 5,081,623 | 1/1992 | Ainscow | 370/451 |
| 5,197,125 | 3/1993 | Engel et al. | 370/458 |
| 5,229,993 | 7/1993 | Foudriat et al. | 370/445 |
| 5,596,576 | 1/1997 | Milito | 370/450 |
| 5,734,656 | 3/1998 | Prince et al. | 370/401 |

FOREIGN PATENT DOCUMENTS

0 451 426 B1  2/1994  European Pat. Off. .

OTHER PUBLICATIONS

Article: The DTM Gigabit Network by Christer Bohm, Per Lindgren, Lars Ramfelt, Peter Sjodin; dated Jun. 17, 1993; pp. 1–20, 22–23.

Article: Fast Circuit Switching for the Next Generation of High Performance Networks; *IEEE Journal on Selected Areas in Communications*, vol. 14, No. 2, Feb. 1996, by Christer Bohm, Markus Hidell, Per Lindgren, Lars Ramfelt, and Peter Sjödin; pp. 298–305.

Article: Multi–gigabit networking based on DTM—A TDM medium access technique with dynamic bandwidth–allocation; *Computer Networks and ISDN Systems 24* (1992) 119–130 North–Holland; by Lars Gauffin, Lars Håkansson, and Björn Pehrson; pp. 119–130.

(List continued on next page.)

*Primary Examiner*—Chi H. Pham
*Assistant Examiner*—Kwang B. Yao
*Attorney, Agent, or Firm*—Fasth Law Offices; Rolf Fasth

[57] ABSTRACT

The present invention relates to a method and an arrangement for centralized and distributed management of capacity (communication resources) in a circuit switched network with shared medium topology (e.g. bus or ring topology), of DTM type (digital synchronous transmission), in which the network use the capacity which are divided into cycles, which in turn are divided into control time slots for signaling and data time slots for data transmission, and where each data time slot is associated with a token. In the centralized version is a first node, named server node, assigned token corresponding to the in one direction sent data time slots on the communication link (e.g., bus or ring). A second node requests token corresponding to a certain capacity from the server node and the server node reserves and transfers tokens corresponding to the capacity requested to the other node in the case the server node has requested capacity unused. In the distributed version the number of server nodes is between two and the total number of nodes connected to the shared medium network.

47 Claims, 21 Drawing Sheets

OTHER PUBLICATIONS

Article: Incorporating continuation–of–message information, slot reuse, and fairness in DQDB networks; *Computer Networks and ISDN Systems 24* (1992) 153–169 North Holland; by Subrata Banerjee and Biswanath Mukherjee; pp. 153–169.

Article: MetaRing—A Full–Duplex Ring with Fairness and Spatial Reuse; *IEEE Transactions on Communications*, vol. 41, No. 1, Jan. 1993; by Israel Cidon and Yoram Ofek; pp. 110–120.

Article: A Simple Scheme for Slot Reuse Without Latency for a Dual Bus Configuration; by Oran Sharon and Adrian Segall, 1993 IEEE, 9 pages.

Article: A Study of Slot Reuse in Dual Bus Multiple Access Networks by Mark W. Garrett and San–Qi Li; 1990 IEEE, pp. 617–629.

Article: L. Ramfelt; by Manoel A. Rodrigues, AT&T Bell Laboratories, Holmdel, NJ 07733; 1990 IEEE; pp. 636–643.

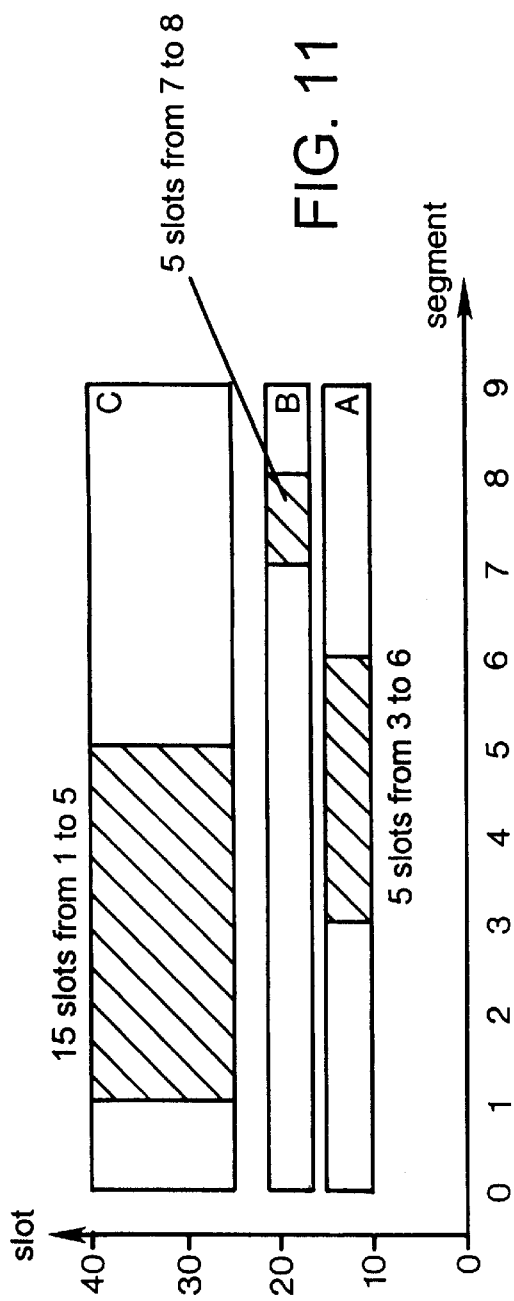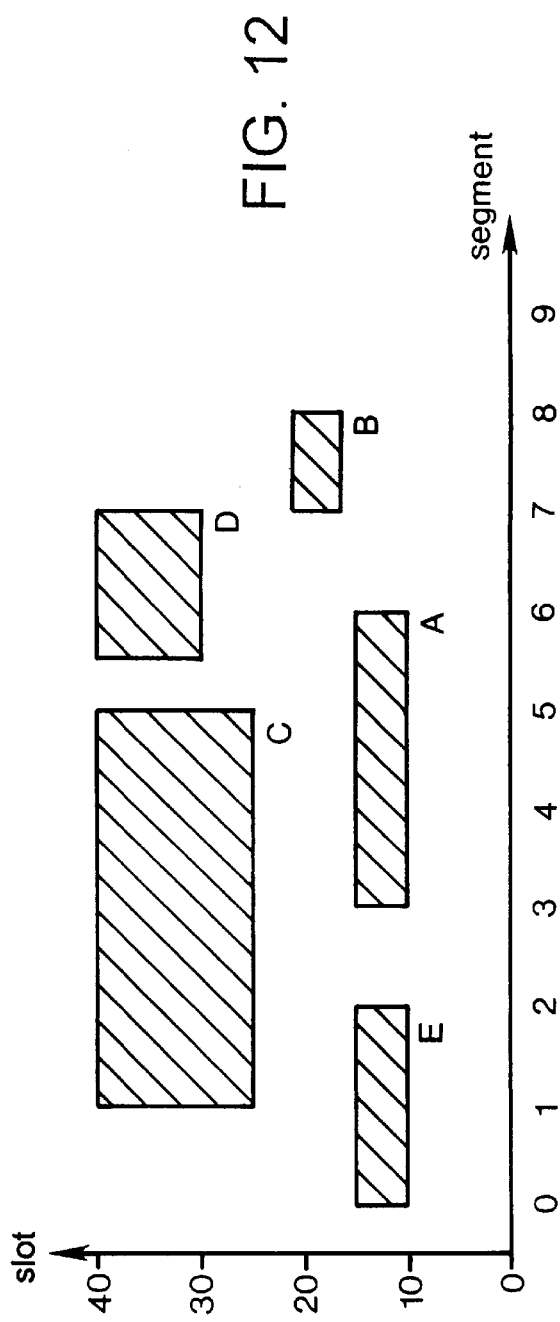

Simulation time in microseconds at load 0,8

Offered load (4MB and 20 Mbit/s channels in DTM)

Offered load (4MB and 20 Mbit/s channels in DTM)

RESOURCE MANAGEMENT SCHEME AND ARRANGEMENT

TECHNICAL FIELD

The present invention relates to a resource management plan and arrangement for distributing network resources in a circuit-switched network having a shared medium topology such as a bus or a ring topology.

BACKGROUND AND SUMMARY OF THE INVENTION

The next generation of networks will integrate services for different kinds of applications: delay-insensitive asynchronous applications like fax, mail, and file transfer, and delay-sensitive applications with real-time requirements, such as audio and video. These different applications have traditionally been supported by different network technologies. Asynchronous communication has been provided by computer networks, which are packet-switched and use store-and-forward techniques, like the Internet. Real-time communication, on the other hand, has been provided by circuit switched, time-division multiplexed telephone networks.

Circuit-switched networks have many attractive properties. Circuits are isolated from each other in the sense that traffic on one circuit is unaffected by activities on the others. This makes it possible to provide guaranteed transfer quality with constant delay, which is suitable for applications with timing requirements. Furthermore, data and control are separated in circuit-switched networks. Processing of control information only takes place at establishment and tear-down of circuits, and the actual data transfer can be done without processing of the data stream, congestion control, etc. This allows large volumes of data to be transferred efficiently. We think that this will be even more important in the future, since developments in photonics will dramatically reduce the cost of transmission, and switches will become the main communication bottlenecks.

The static nature of ordinary circuit-switched networks makes them inappropriate for certain types of traffic. Traditionally, circuits have fixed capacity, long set-up delay and poor support for multicast. These shortcomings make it difficult to efficiently support, for example, computer communication in a circuit-switched network. This has motivated a search for alternative solutions, and the predominant view is that the next generation of telecommunication networks should be cell-switched, based on ATM. Cells are small, fixed-size packets, so this is an orientation towards packet-switching. This means that many of the weaknesses of packet-switching are present also in cell-switched networks, in particular in the area of providing guaranteed quality of service. Therefore additional mechanisms, such as admission control, traffic regulation, scheduling of packets on links and resynchronization at the receiver are needed to integrate support for different kinds of traffic. One of the main concerns with packet switched networks in general, and ATM in particular, is whether it is possible to realize these mechanisms in a cost-effective way.

DTM, Dynamic synchronous Transfer Mode, is a broadband network architecture developed at the Royal Institute of Technology in Sweden. It is an attempt to combine the advantages of circuit-switching and packet-switching, in that it is based on fast circuit-switching augmented with dynamic reallocation of resources, supports multicast channels, and has means for providing short access delay. The DTM architecture spans from medium access, including a synchronization scheme, up to routing and addressing of logical ports at the receiver. DTM is designed to support various types of traffic and can be used directly for application-to-application communication, or as a carrier network for other protocols; such as ATM or IF. A prototype implementation based on 622 Mbps optical fibers has been operational for two years, and work is in progress with a wavelength-division multiplexed version with four wavelengths.

Fast circuit-switching was proposed for use in telephone systems already in the early 1980s. A fast circuit-switched telephone network attempts to allocate a transmission path of a given data rate to a set of network users only when they are actively transmitting information. This means that a circuit is established for every burst of information. When silence is detected, the transmission capacity is quickly reallocated to other users. In the form used in TASI-E, fast circuit-switching has been deployed for intercontinental communication between Europe and the United States. Burst switching is another form of fast circuit-switching, where a burst (consisting of a header, an arbitrary amount of data and a termination character) is sent in a time-division channel of fixed bit-rate and is thus interleaved with other bursts. This makes burst switching different from fast packet switching, where packets are sent one at a time with full link bandwidth. Furthermore, the length of a burst is not, in contrast to a packet, determined before the start of transmission.

It has been shown that the signaling delay associated with creation and tear-down of communication channels determines much of the efficiency of fast circuit-switching. DTM is therefore designed to create channels fast, within a few hundreds of microseconds. DTM differs from burst switching in that control and data are separated, and it uses multi-cast, multi-rate, high capacity channels to support a variety of different traffic classes. This means for example that it is possible to increase or decrease the allocated resources of an existing channel. Even though a DTM network may have the potential to create a channel for every message, we do not believe this approach suitable for all traffic classes. Rather, it is up to the user to decide whether to establish a channel per information burst or to keep the channel established even during idle periods.

New high-capacity communication networks and protocols are constantly being developed by the communications industry and academia. This development changes frequently and new results are important to application developers who integrate real-time audio, video, and asynchronous communication services into applications. The applications can be found on a wide range of network access terminals. Terminals act as network hosts and may be almost any electronic device, including small pocket telephones or television sets, multi-media work-stations, and million-dollar super-computers. Hosts differ by orders of magnitude in their needs for processing power, and in their communication services requirements. These disparate needs are currently reflected in a set of independent network classes. Each network class is optimized for its particular traffic and applications: cable television networks use unidirectional broadcast networks where the capacity is divided into fixed-sized sub-channels carrying video. A telephone network uses only 64 kbit/s duplex circuits with guaranteed throughput and tightly controlled delay variations. Computer networks, such as the Internet, allow a large number of parallel network sessions by use of connectionless packet switching. They also use statistical multi-plexing to efficiently utilize links. A backbone network for mobile systems needs extra control (or signaling) capacity to dynamically track all active terminals.

With this wide spectrum of applications existing today and to be augmented in the future, it is infeasible to continually invent new, sometimes global, networks and a new terminal interface for each new type of service. Instead, an integrated services network supporting existing and new services needs to be deployed. The overall goals for such a network are scaleability to global size and maximum sharing of expensive network components to minimize cost. Optical transmission technology has been shown to provide the necessary link capacity at a low enough price to make integrated services networks a realistic solution.

A new integrated optical network with much higher capacity will, however, introduce new problems not seen in today's more specialized and lower performance networks. First, when network capacity increases and the information flight latency remains limited by the speed of light, the increasing bandwidth delay product will put higher demands on mechanisms that isolate a user's traffic from third-party network traffic. A telephone session, for example, should not be affected by another user opening a high-capacity video channel. Second, applications and protocols will need to operate reliably with an increasing amount of information in transit to benefit from the increased network capacity. This will lead to larger burst and transaction sizes in the network.

Current networks using stateless packet switching protocols such as the Internet Protocol (IP)[rfc791, Come91:Internetworking1] have turned out to be extremely scalable. They have evolved from small networks connecting just a few Defense Advanced Research Projects Agency (DARPA) [rfc1120,Come91:Internetworking1] research computers in the mid seventies to the current global and ubiquitous Internet[rfc1118].

Shared medium local area networks (see [stallings94:data]) (LAN's) such as CSMA/CD, token ring and FDDI are used in the Internet as simple building blocks connected by routers or bridges. The combination of easy expansion, low incremental node cost and tolerance to faulty nodes has resulted in simple, flexible, and robust networks. Also, the shared medium allows efficient application of new multicast protocols such as IP multicast[rfc988].

A drawback of the shared medium is that it typically permits only a single terminal to transmit at any time, thereby not utilizing all network segments efficiently. A scheme allowing the capacity of the medium to be reused may be designed, but this is often at the cost of complexity in the high-speed access control hardware. Access control mechanisms for a shared medium also depend strongly on the size of the network and are usually efficient only for local area environments.

The two main types of network are connection oriented circuit-switched networks used for telephony, and connectionless packet-switched networks exemplified by the Internet. When a circuit-switched network is used for data communication, circuits need to remain open between bursts of information, wasting network capacity. This problem arises because circuit management operations are slow compared to dynamic variations in user demand. Another source of overhead in circuit-switched networks is the limitation of requiring symmetrical duplex channels, which introduce 100% overhead when information flow is unidirectional. This constraint also makes multicast circuits inefficient and difficult to implement. A connectionless packet-switched network, on the other hand, lacks resource reservation and must add header information to each message before transmission. Furthermore, latency in a connectionless packet-switched network cannot be accurately predicted and packets may even be lost due to buffer overflow or corrupted headers. The latter two factors make real-time service difficult to support. Congestion avoidance mechanisms can isolate traffic streams of different users. These schemes are, however, limited to operating on a time scale comparable to the round-trip packet delay.

To address the problems mentioned above, the communications industry is focusing on the development of Asynchronous Transfer Mode (ATM). ATM has been proposed for LAN's and many future public networks. International Telegraph and Telephone Consultative Committee (CCITT) also adopted it to be used as the transfer standard in broadband ISDN (B-ISDN). ATM networks are connection-oriented and establish a channel just as circuit-switched networks, but use small fixed-sized packets called cells for information transfer. The packet-switched nature of ATM means that the network needs to have new mechanisms such as buffer resource managers and link schedulers to establish real-time guarantees for a connection.

Our solution for providing real-time guarantees centers on a circuit-switched network and we must therefore address circuit-switching concerns such as those described above. We also employ a new shared-medium control protocol, and so must consider common shared-medium problems. Our design, called Dynamic synchronous Transfer Mode (DTM), uses channels as the communication abstraction. Our channels differ from telephony circuits in various ways. First, establishment delay is short so that resources can be allocated/deallocated dynamically as fast as user requirements change. Second, they are simplex and so minimize overhead when the communication is unidirectional. Third, they offer multiple bit-rates to support large variations in user capacity requirements. Finally, they are multicast, allowing any number of destinations.

DTM channels share many beneficial properties with circuits. There is no transfer of control information after channel establishment, resulting in very high utilization of network resources for large data transfers. Support of real-time traffic is natural; there is no need for policing, congestion control or flow-control within the network. The control information is separated from data, which makes multicast less complex. The transmission delay is negligible (i.e. less than 125 us) and there is no potential for data loss caused by buffer overflow as in ATM. Bit-error rates depend on the underlying link technologies, and switches are simple and fast due to strict reservation of resources at channel setup.

The present invention relates to a method and arrangement for centralized and distributed management of capacity (communication resources) in a circuit switched network with shared medium topology such as bus or ring topology of DTM type (digital synchronous transmission) in which the network use the capacity which are divided into cycles which in turn are divided into control time slots for signaling and data time slots for data transmission. Each data time slot is associated with a token. In the centralized version is a first node, called server node, that is assigned tokens corresponding to the unidirectionally flowing data time slots on the communication link (e.g. bus or ring). A second node requests tokens corresponding to a certain capacity from the server node and the server node reserves and transfers tokens corresponding to the requested capacity to the other node if the server node has the requested capacity available. In the distributed version, the number of server nodes is between two and the total numbers of nodesconnected to the shared medium topology.

BRIEF DESCRIPTION OF THE DRAWINGS

FIG. 11 illustrates a token map showing slot number and segment according to the present invention;

FIG. 12 illustrates a slot-segment map showing reuse of time slots according to the present invention;

DETAILED DESCRIPTION OF THE PRESENT INVENTION

With reference to FIGS. 1–28 the present invention is designed for a unidirectional medium with multiple access, i.e., a medium with capacity shared by all connected nodes. It can be built on several different topologies, such as ring, folded bus or dual bus. We chose the dual bus, since it has shorter average inter-node distance than a folded bus, and DTM's synchronization scheme was found to be easier to implement on a dual bus than on a ring.

Figure 1:
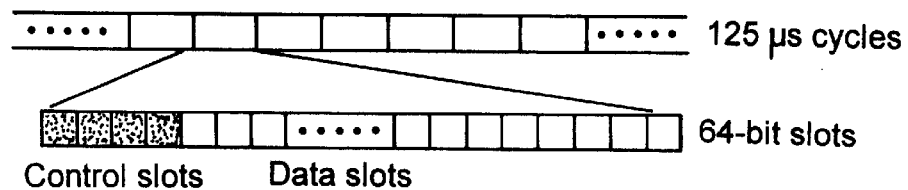
FIG. 1 illustrates a DTM multiplexing format of the present invention.

The service provided is based on channels. A channel is a set of time slots with a sender and an arbitrary number of receivers; it is guaranteed that the data will reach the receivers at the rate given by the capacity of the channel. The channels on the physically shared medium are realized by a time division multiplexing (TDM) scheme (FIG. 1). The total capacity is divided into cycles of 125 microseconds which are further divided into 64-bit slots.

The slots are separated into data and control slots. Each node has access to at least one control slot, which is used for sending control information to the other nodes. Control messages can be sent upon request from a user, in response to control messages from other nodes or spontaneously for management purposes. The control slots constitute a small fraction of the total capacity, while the major part of the slots are data slots carrying payload. At system start-up, the data slots are allocated to the nodes according to some predefined distribution. This means that each node "owns" a portion of data slots. A node needs ownership of a slot to send data in it, and the ownership of slots may change dynamically among the nodes during the operation of the network.

DTM uses a distributed algorithm for slot reallocation, where the pool of free slots is distributed among the nodes. There were two main reasons for using a distributed scheme instead of a central pool of slots. First, when a node can establish a channel using only slots from the local pool, there is very little overhead in the channel establishment. Second, a distributed algorithm does not rely on a single node, so it has some tolerance to node failures. The main drawback of a distributed implementation is the overhead of communication and synchronization between nodes.

At the reception of a user request, the node first checks its local pool to see if it has slots enough to satisfy the request and, if so, immediately sends a channel establishment message to the next hop. Otherwise the node first has to request more slots from the other nodes on the bus. Each node maintains a status table that contains information about free slots in other nodes, and when more slots are needed the node consults its status table to decide which node to ask for slots. Every node regularly sends out status messages with information about its local pool of slots. Status messages have lower priority than other control messages so they are only sent when the control slot otherwise would be unused. Furthermore, the reallocation algorithm does not depend on nodes to process all status messages, so a node can safely ignore status messages while it is busy.

The procedure for slot reallocation is simple and works as follows: if a user requests a channel with M slots and the node has N free slots, where N<M, it sends requests asking for M-N slots. The node starts by sending a request to the closest node with free slots. If this node does not have sufficiently many free slots, according to the status table, a request is sent also to the second closest node with free slots, and so on. The node waits until a response for each of the requests has been received and then grants or rejects the channel request, depending on the outcome of the reallocation procedure.

A node that has some amount J of free slots and is receives a slot reallocation request for K slots will always give away min(J, K) slots. The node responds by sending a slot reallocation confirmation, which indicates what slots the node gives away. If the requested node does not have any free slots, it responds with a slot reallocation reject instead. In addition to this algorithm, resources may be controlled by a network management system. For example, to Prevent the network from starvation, a node can be configured not to give away all its slots, but to keep a certain fraction of its initial share.

Figure 2:
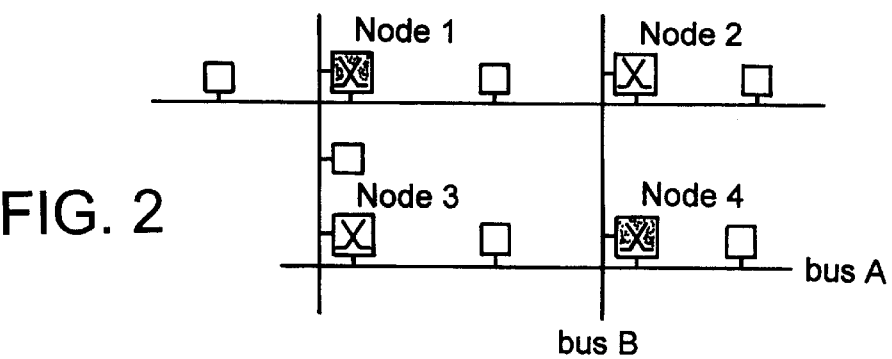
FIG. 2 illustrates DTM nodes interconnected in a mesh structure according to the present invention.
Figure 3:
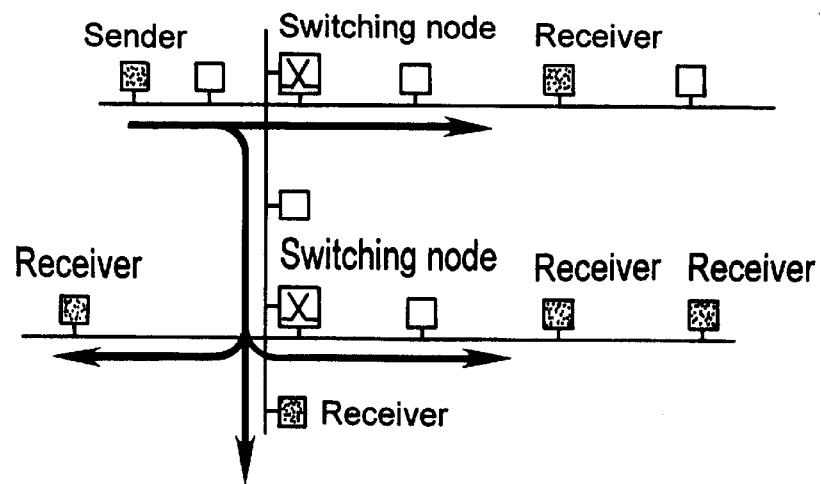
FIG. 3 illustrates a multicast group of the present invention.

A DTM network can be expanded by interconnecting several buses with switch nodes (see FIG. 2). DTM uses decentralized switching in the sense that any node connected to two or more buses can switch data between them. One advantage with this is that the switching capacity can be increased gradually by adding more switch nodes. The switching is synchronous, which means that the switching delay is constant for a channel. This means that a multi-hop channel has roughly the same properties as a channel on a single bus. The only difference is that a switched channel has slightly longer delay (up to 125 microseconds for each hop). Provided that a switch node can buffer one cycle of data for each of its buses, there cannot be any congestion or overflow in the node.

The synchronization between buses is done on a per cycle basis—cycles are started with the same frequency on all buses. This is accomplished by letting one network node be responsible for generating the cycles periodically on all its outgoing buses. For each new cycle, this node generates a cycle-start marker that is forwarded to all buses iii the network. For each bus there is one switch node that is responsible for forwarding the marker onto the bus. Those switch nodes need to be organized in such a way that the marker reaches every bus exactly once. When the marker reaches a bus, the cycle is restarted on this bus.

The cycle time and the slot size are both constant for all buses, which means that the synchronization scheme allows different buses to run at different bit rates. This makes it possible to upgrade or reconfigure individual buses in a network without affecting the rest of the network.

The channel abstraction in DTM differs from ordinary circuits, in that channels have the following properties.

Simplex: a channel is set up from sender to receivers. A duplex connection consists of two channels, one in each direction.

Multirate: channels may consist of an arbitrary number of data slots, which means that channel capacity can be any multiple of 512 Kbps, up to the entire data capacity of the bus.

Multicast: a channel can have several receivers.

A node creates a channel by allocating a set of data slots for the channel and by sending a channel establishment control message. The control message is addressed either to a single node or to a multicast group, and announces that the channel has been created and what slots it uses.

To create a channel, slots must be allocated at the sender and at each switch node along the channel's route. Thus, switch nodes allocate slots for a channel on behalf of the sender. The switch nodes then start switching the channel, by copying the channel's slots from the incoming to the outgoing bus. An attempt to establish a multi-hop channel fails if any of the switch nodes involved cannot allocate the required amount of slots. In this case another route has to be tried. In a grid structure, there are normally several routes between each pair of nodes. The current version of the protocol uses source routing together with an addressing scheme based on (x, y) coordinates in the grid. A simple load-balancing scheme for two hops is achieved by letting each switch node use status messages to send information about the amount of free slots on its outgoing buses. For example, there are two possible routes between node 1 and node 4 in FIG. 2, so if node 1 wants to set up a connection to node 4 it can choose between using switch node 2 and switch node 3. Node I receives status information from node 2 and 3, and can make its routing decision based on this information. This algorithm works well for dense grid networks, where most routes use only two hops, but a general routing algorithm is required for more arbitrary topologies.

A traditional circuit is a point-to-point connection between a sender and a receiver. DTM uses a shared medium which inherently supports multicast since a slot can be read by several nodes on a bus. A multicast channel can easily be extended to span over several hops, since the switch operation is actually a multicast operation, in the sense that it duplicates data onto another bus (see FIG. 3).

In this section we investigate throughput and delay under varying traffic conditions. We have performed simulations for two different network topologies:

A dual bus with 100 nodes.

A fully connected grid of dual buses with 20×20 nodes.

In the simulation model, nodes receive transfer requests from a traffic generator and control messages from other network nodes. These events are put in an input queue at the node, and the node processes one event at a time. The time to process one event is 5 microseconds. Transfer requests are generated by Poisson processes, and source and destination addresses are uniformly distributed. For each transfer request, a node attempts to allocate slots and, if that succeeds, establishes the channel, transfers the data and takes down the channel. This means that slots are released as soon as the transfer is done.

The simulations are performed for different transfer sizes (1 to 256 kilobytes), for different kinds of user requirements, and for different inter-node distances (0.01 to 10 kilometers). The link bit-rate is 4.8 Gbps, which gives a slot rate of 75 MHz and a cycle size of 9600 slots. Each transfer requests 40 slots per cycle. This corresponds to 20.48 Mbps channels, which means that a 16 kilobyte transfer, for example, takes about 6 milliseconds.

We calculate the throughput by dividing the total amount of transferred user data by the simulated time, and normalize this value to the capacity of one dual bus (9.6 Gbps). The maximum throughput that is possible to achieve is always less than the link capacity, since some capacity is used for control messages. In the single dual bus simulations, with 100 nodes, the control capacity is 5 control slots per node, which corresponds to 5% overhead. The maximum possible throughput is then 0.95.

The grid has more nodes than the single dual bus, but fewer nodes per bus (20 instead of 100). Since the traffic load on a bus is distributed over its nodes, this means that at a given bus load, the grid will have more traffic to and from each node. A node in the grid therefore needs more control slots. However, a node has limited capacity to process control messages, and we have found that with 5 microseconds event processing time, very little performance is gained by using more than 10 control slots per node. We therefore use 10 control slots per node in the grid, which gives a maximum possible throughput of 0.98.

Access delay is the average time from the time that a request arrives to the node until the data transfer starts. It is a measure of the overhead at channel establishment and includes the time it takes to allocate slots, send a channel establishment message to the receiver, and send the first slot of data. In the multi-hop case, the sender waits for a confirmation from the receiver that the channel has been established on both buses before it starts sending data. For the single hop case, the sender alone creates the channel to the receiver, and can therefore start sending data as soon as the slots have been allocated.

The first set of simulations concerns performance of one dual bus. The purpose of these simulations is mainly to study slot allocation schemes for different user requirements. Since slot allocations on different buses are independent operations, these results are generally applicable for the multi-hop cases as well.

Figure 4A:
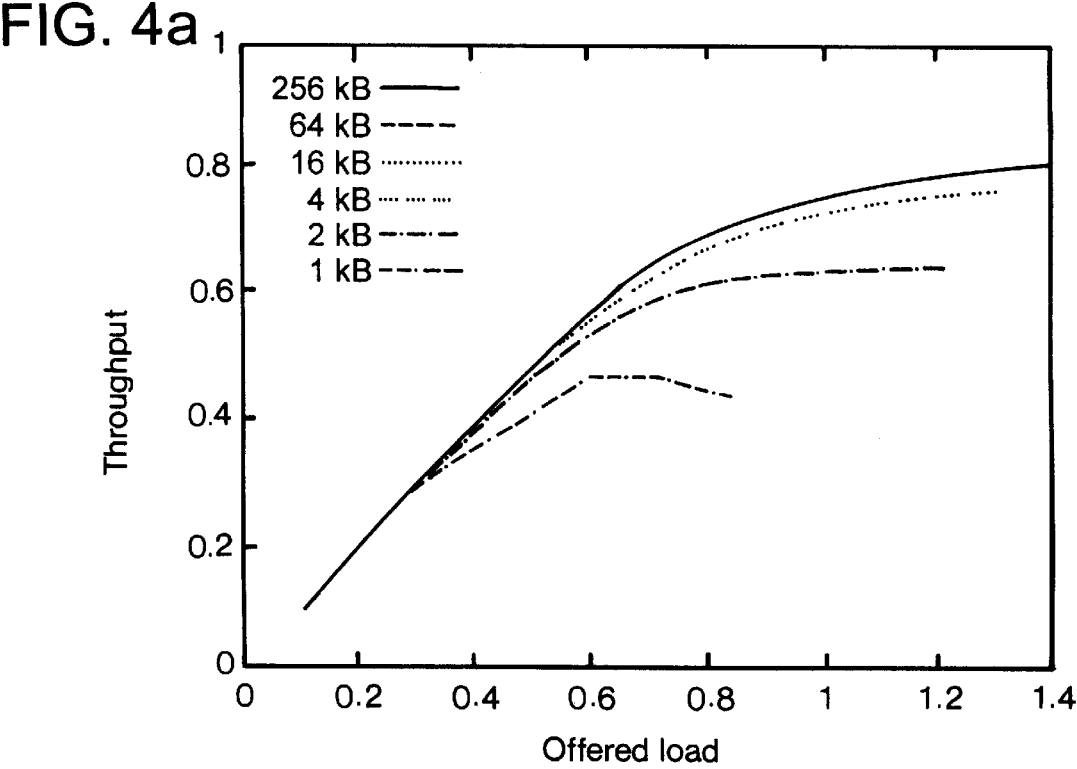
FIGS. 4a/4b illustrate throughput and access delays for different packet sizes according to the present invention.
Figure 4B:
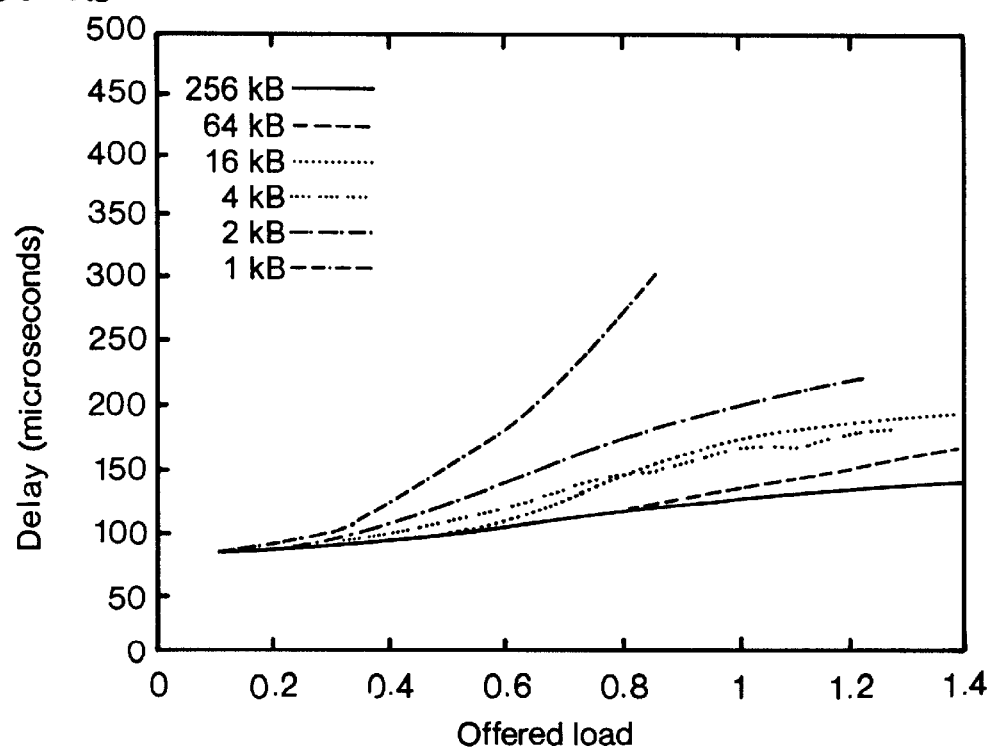

FIG. 4 shows the results of a basic simulation where a node makes at most one attempt to allocate the requested capacity for a channel, and rejects the request if the full requested capacity cannot be allocated. Transfer sizes between 1 and 256 kilobytes are simulated. The simulations could not be carried out for the smallest transfers (1 and 2 kilobyte in FIG. 4) at high load, due to the simulator event queue growing too large, indicating that the control capacity is exhausted.

At low load, most transfer requests are accepted immediately and the throughput therefore increases linearly with the load. At higher load, slot reallocation becomes frequent, some transfer requests are rejected, and the throughput increases only marginally with the load. If the load gets even higher, the signaling capacity is exhausted, and throughput does not increase (or goes down, as in the case for 1 kilobyte transfers in FIG. 4). Smaller transfers require more frequent control signaling than large transfers at a given load, and therefore throughput is lower for smaller transfers than for larger (at most 0.47 is achieved for 1 kilobyte transfers, which is 50% of the maximum possible throughput, compared to 85% for 256 kilobyte transfers). Throughput is also limited by the strict user behavior, requiring the entire requested capacity to be allocated in a single attempt. The simulations reported below show that throughput can be increased by relaxing this requirement.

The access delay consists, at low load, mainly of the time it takes for a node to process the transfer request, wait for the first available control slot (for the channel establishment message), and then for the first data slot (80 microseconds together, on the average). When the load increases, nodes have to request slots from other nodes and more delay is introduced.

Figure 5A:
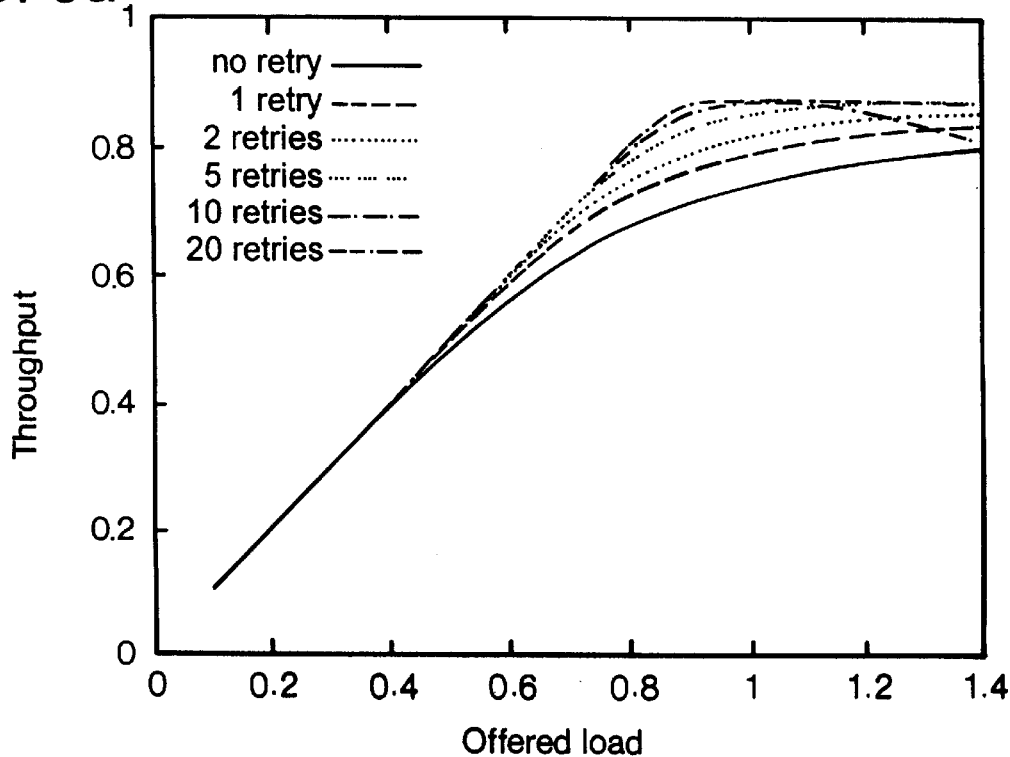
FIGS. 5a/5b illustrate throughput and delays for strict capacity demand with retry (16 kilobyte transfer) according to the present invention.
Figure 5B:
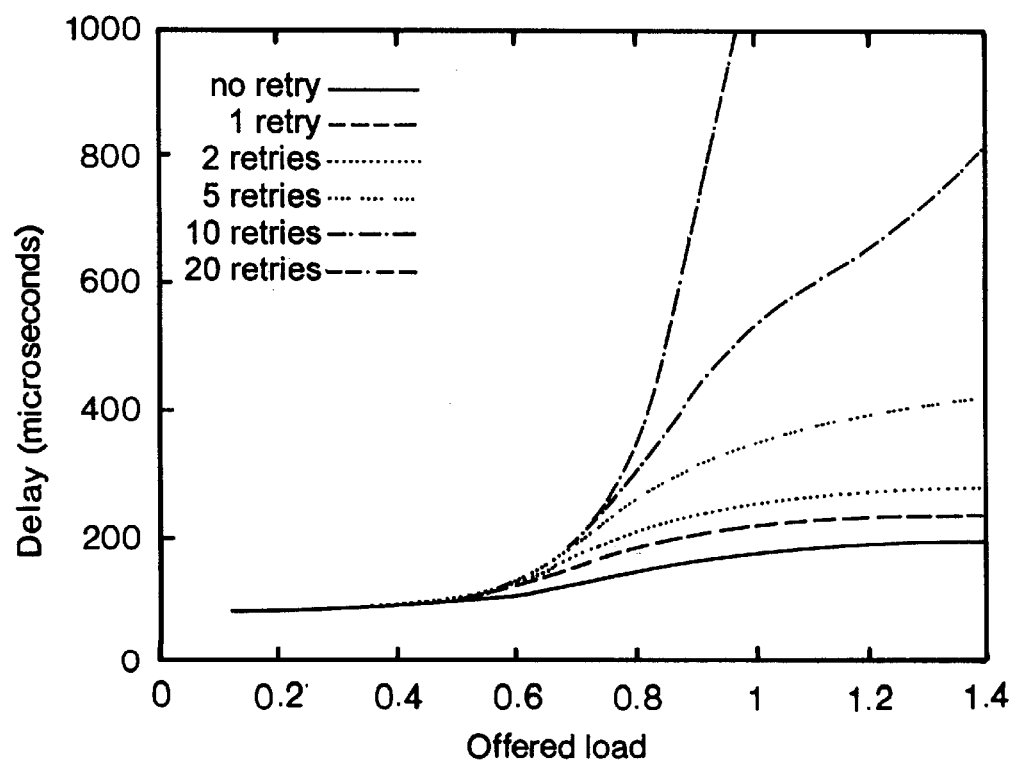

It is possible to increase throughput by letting a node retry, that is, make more than one attempt to allocate slots for a channel. FIG. 5 shows throughput and access delay for different values of the maximum number of retries allowed. When nodes are allowed to retry, more channels can be established and throughput increases (up to 92% of the maximum possible throughput), but at the expense of longer access delay and more signaling. Thus, retry is best suited for applications that have strict bandwidth demand but can tolerate some access delay. However, if a large number of requests are persistently retried (as in an overload situation), performance will degrade. FIG. 5 shows that performance decreases when the load is high and nodes are allowed to retry 20 times, which indicates that the signaling capacity is not sufficient for 20 retries.

Figure 6A:
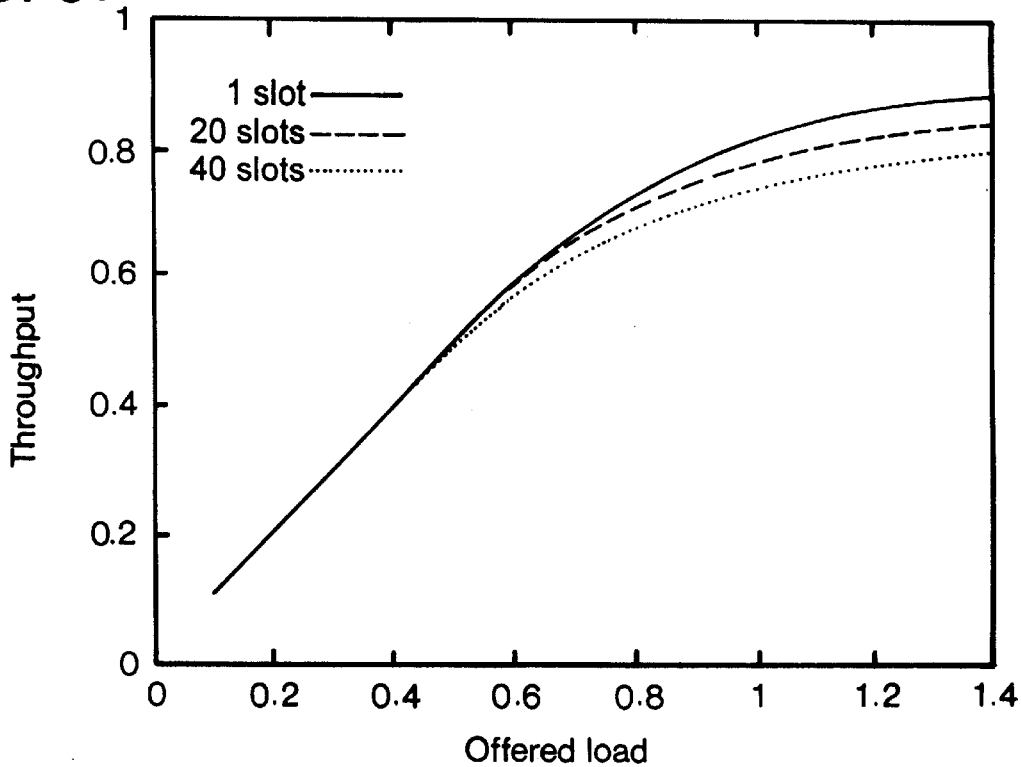
FIGS. 6a/6b illustrate throughput and delays for different user requirements (16 kilobyte transfer) according to the present invention.
Figure 6B:
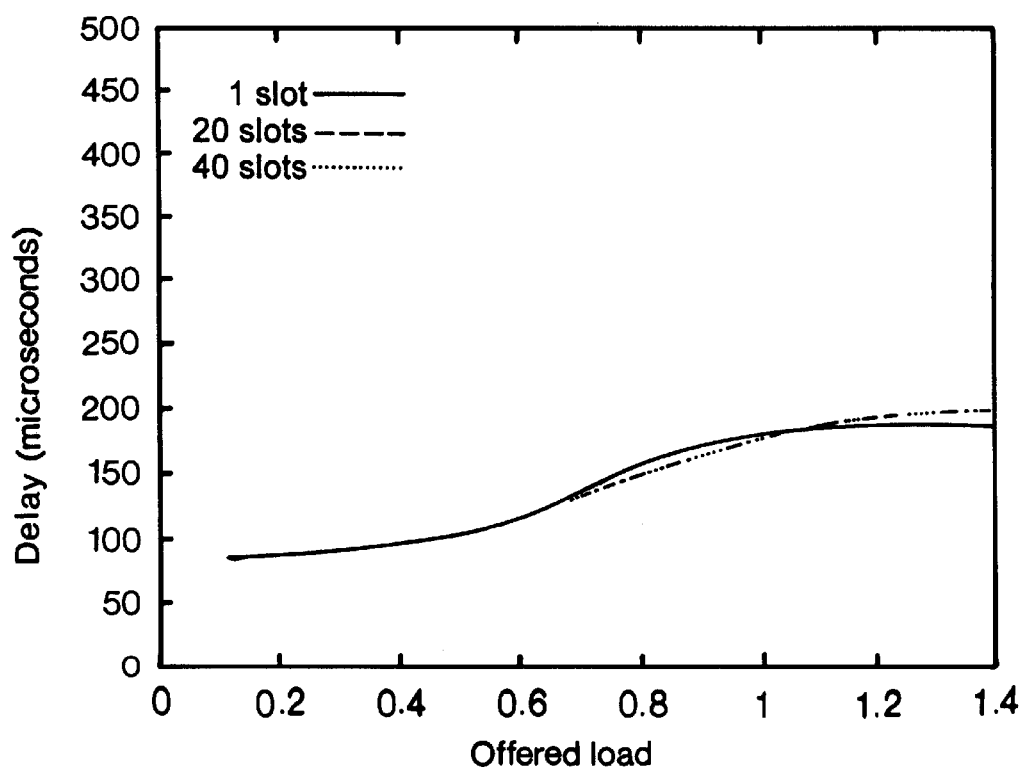
Figure 7A:
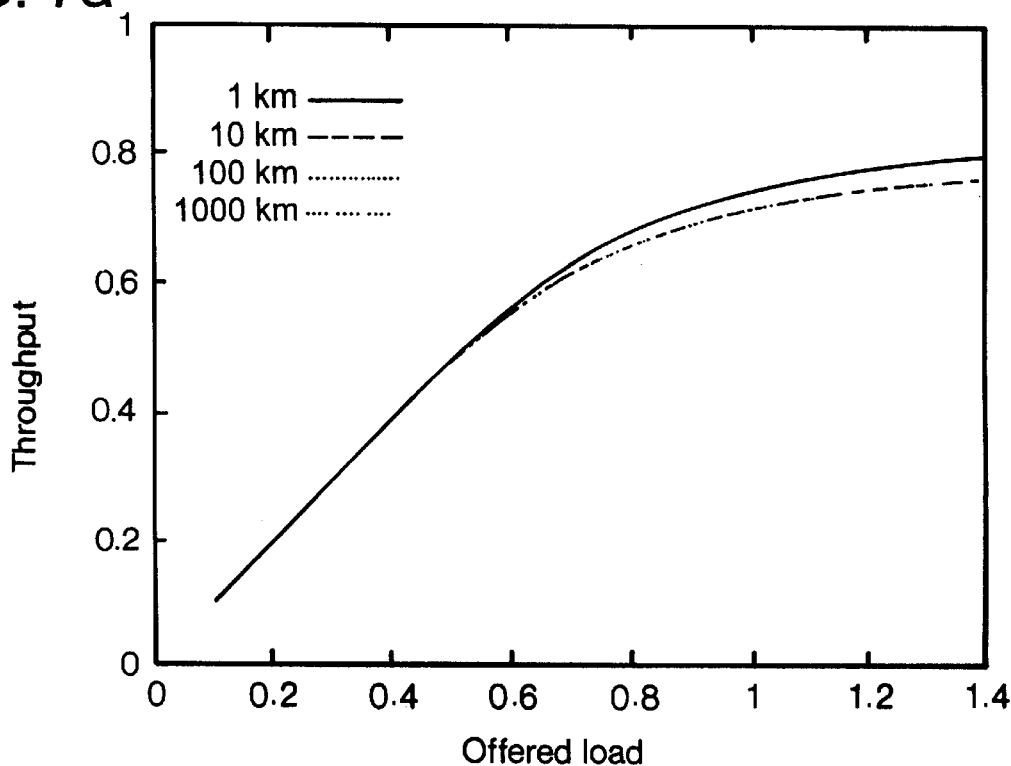
FIGS. 7a/7b illustrate network throughput and access delays as a function of the bus length (16 kilobyte transfer) according to the present invention.
Figure 7B:
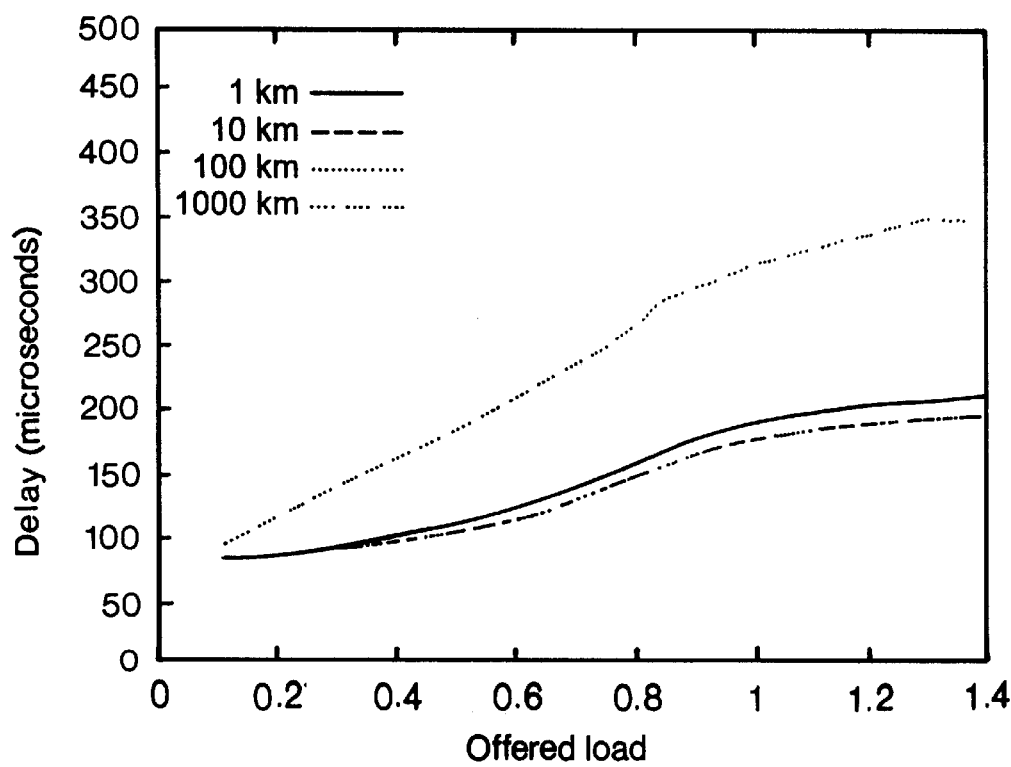

An application with less stringent demands on capacity may be prepared to accept channels with less capacity than requested. This allows more channels to be established with a single slot reallocation attempt. FIG. 6 shows throughput and delay for three cases: when the user is satisfied with any capacity (minimum 1 slot), requires at least half the requested capacity (20 slots), and needs the full capacity (40 slots). Throughput goes up when the user is less demanding. When the user requires only one slot, the throughput achieved is 94% of the maximum possible throughput. The slot reallocation procedure is however the same in all three cases, which explains why access delay is practically the same in the three cases.

When the distance between nodes is increased, it takes longer time to exchange control messages for slot reallocation. This can be seen in FIG. 7, which shows throughput and access delay for different bus lengths (with strict capacity demand without retry, i.e., the same slot allocation principle as in FIG. 4). The access delay increases significantly when the bus gets longer. However, this affects mainly the creation of channels, and throughput is therefore relatively independent of distance. Another effect of increased bus length is that it takes longer time to propagate status information, which may increase the probability of slot reallocation failure. This would mainly influence throughput, but the simulation results indicate that this has only a minor effect.

Figure 8A:
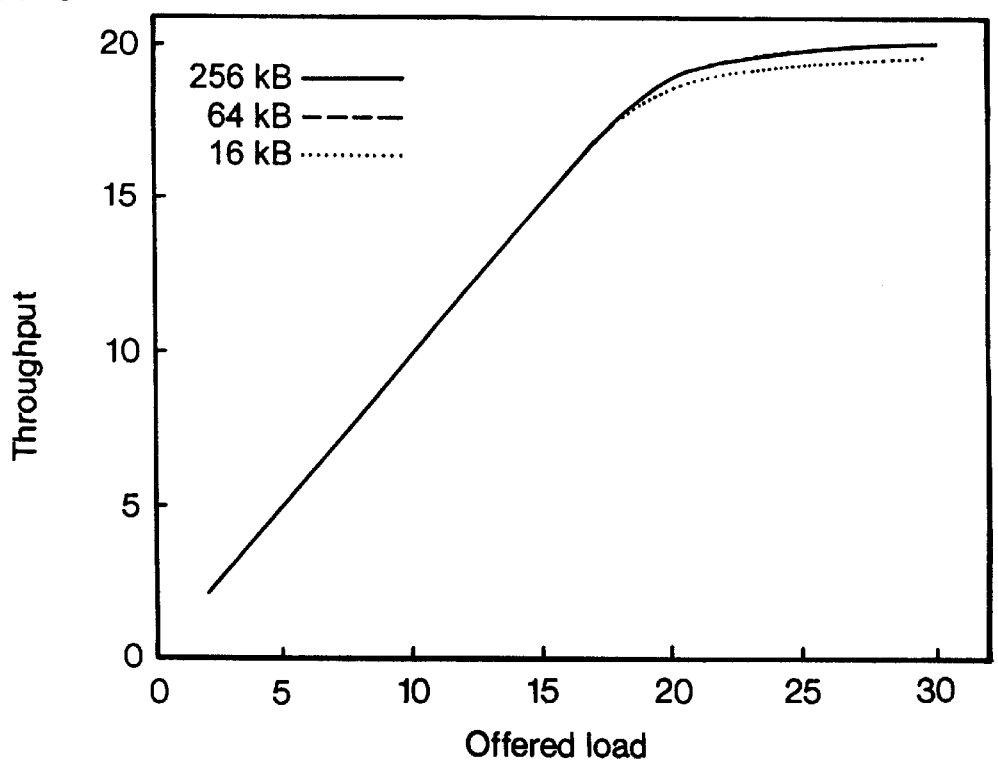
FIGS. 8a/8b illustrate throughput and access delays in a 20×20 grid according to the present invention.
Figure 8B:
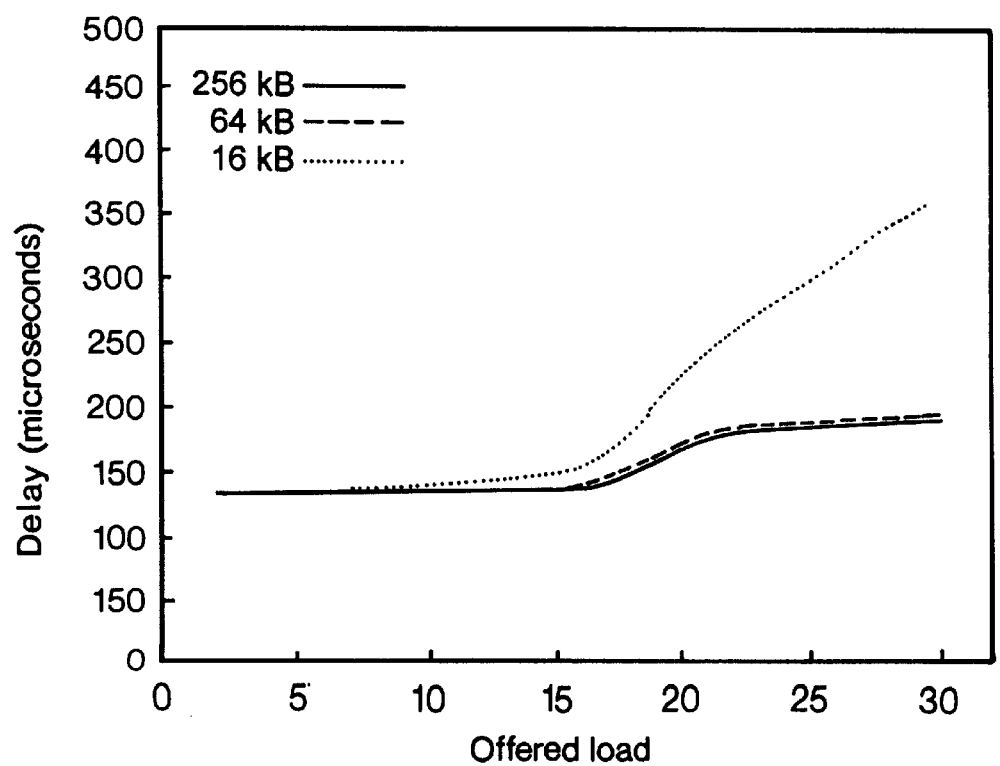
Figure 9:
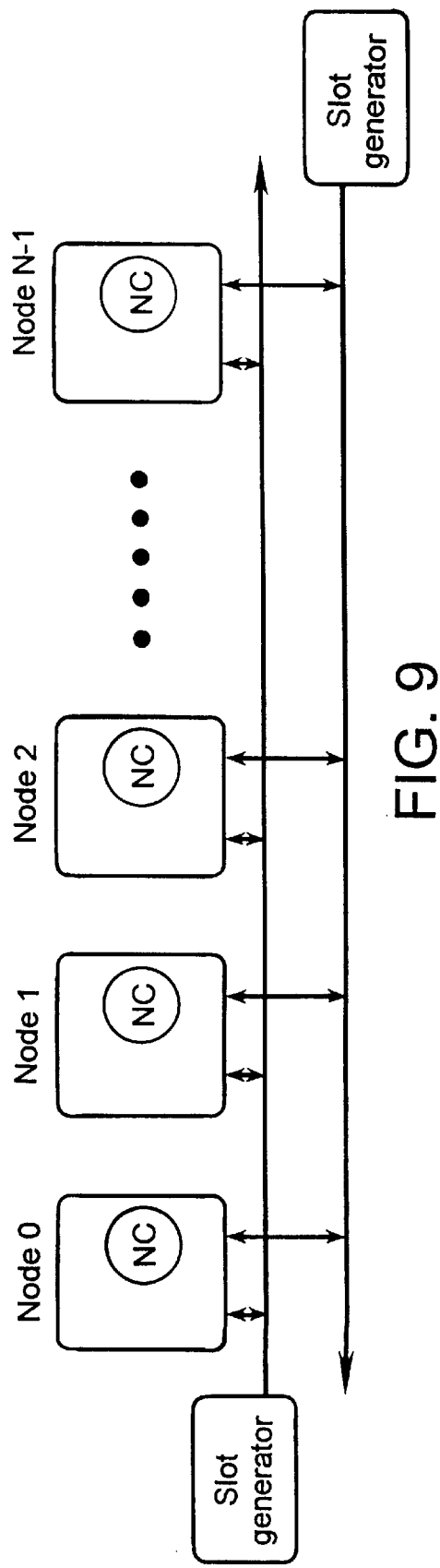
FIG. 9 illustrates a dual-bus DTM network according to the present invention.
Figure 10:
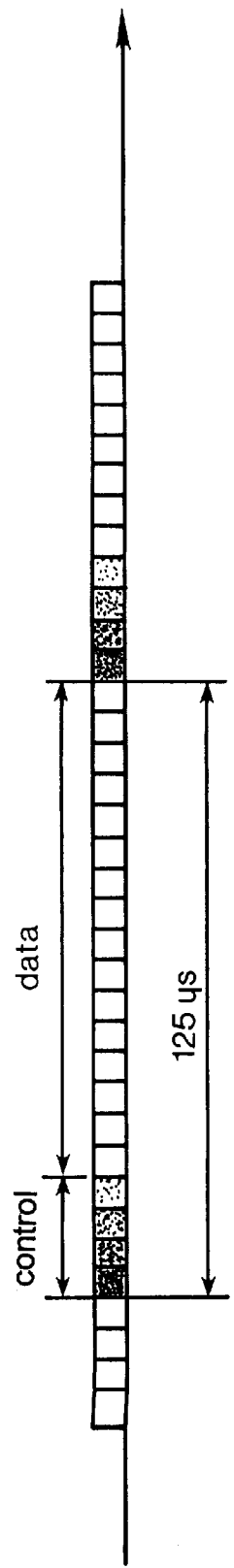
FIG. 10 illustrates a DTM for a 125 microsecond cycle according to the present invention.

FIG. 8 shows the result of a simulation for multi-hop channels. The network is a fully connected grid network with 20×20 nodes. Channels use at most two hops, and the routing decision is based on the information from status messages. The slot allocation principle is the same as in FIG. 4, that is, strict demand without retry.

With uniform distribution of source-destination pairs, the theoretical maximum throughput of a fully connected grid is n/2+1, where n is the number of buses. With 2.1% signaling overhead, the 20×20 grid has a maximum possible throughput of approximately 20.6. FIG. 8 shows that for 256 kilobyte transfers, the maximum throughput is 97.5~b of the possible maximum, compared to 95.1% for 16 kilobyte transfers. This is significantly more than in the case of one dual bus (FIG. 4), and our explanation for this is that there are less nodes per bus in the grid, which means that the pool of free slots is less scattered, and therefore there is a higher probability that slot reallocation succeeds.

The access delay for a multi-hop channel will be longer than on a single hop, since slots have to be allocated on two buses. For 256 kilobyte transfers, the access delay is roughly 50 per cent longer in the multi-hop case compared to the single hop case. One could expect the access delay in the grid to be longer than this. There are two main reasons why this is not the case. First, there is a certain amount of parallelism in channel establishment over two hops. Second, the interval between control slots is shorter in the grid, so a node spends legs time waiting for control slots. For 16 kilobyte transfers, however, the delay increases dramatically for higher load, which indicates that signaling capacity is insufficient.

The Dynamic synchronous Transfer Mode (DTM) is a network architecture for integrated services. It is based on fast circuit switching, and provides multi-rate, multicast channels with short set-up time. A channel gives guaranteed capacity and constant delay, which makes it well suited for real-time traffic, such as video and audio. In contrast to traditional circuit-switched networks, DTM also provides dynamic reallocation of resources between nodes in order to support dynamically varying traffic.

We have reported performance analysis through computer simulations for various configurations. The analysis focuses on packet-like traffic patterns, since this type of traffic is considered to be the most challenging for a network based on circuit switching. The intention is to study how network utilization and access delay are affected when channels are frequently established and released. We use 20 Mbps channels, where a channel is established for each transfer, and the transfer size varies between 1 and 256 kilobytes. The analysis was performed for two kinds of topologies: a dual bus and a grid of dual buses. The protocol requires that a certain fraction of the total capacity is reserved for control information: we used about five per cent for the dual bus, and two per cent for the grid.

The results show that when the traffic consists of short, frequent transfers (of a few kilobytes), performance is determined by the amount of signaling capacity available. For the dual bus, good results are achieved even when the network is loaded with transfers that are only few kilobytes long, whereas the grid was saturated for 16 kilobyte transfers. To summarize, the paper shows that fast circuit switching, as applied in DTM, performs well even for packet traffic using short-lived connections. This, in combination with its inherent support for real-time traffic, makes fast circuit-switching an appealing alternative for B-ISDN and beyond.

The basic topology of a DTM network (see FIG. 9) is a bus with two unidirectional optical fibers connecting all nodes. Several busses with different speeds may be connected together to form an arbitrary multistage network. In the current prototype implementation [15], buses can be combined into a two-dimensional mesh [16]. A node at the junction of two buses can synchronously switch data slots between the two busses. This allows for efficient switching with constant delay through the node. The primary communication abstraction in DTM is a unidirectional, multi-rate and multicast channel [18].

The DTM medium access protocol is a time-division multiplexing scheme. The bandwidth of the bus is divided into 125 us cycles (FIG. [1]), which in turn are divided into 64-bit time slots (or slots for short). The number of slots in a cycle thus depends on the network's bit-rate; for instance, on a 6.4 Gbit/s network there are approximately 12500 slots per cycle.

The slots are divided into two groups, control slots and data slots. Control slots are used to carry messages for the network's internal operation, such as messages for channel establishment and bandwidth reallocation. The data slots are used to transfer user data and are not interpreted by intermediate network nodes. Intermediate nodes are nodes between the source and destination.

In each network node there is a node controller, which controls the access to data slots and performs network management operations, such as network start-up and error recovery. The main tasks of the node controller are to create and terminate channels on demand from users, and to manage network resources in response to user requests and in the background.

Control slots are used exclusively for messages between node controllers. Each node controller has write permission to at least one control slot in each cycle, which it uses to broadcast control messages to down-streams nodes. Since write access to control slots is exclusive, the node controller always has access to its control slots, regardless of other nodes and network load. The number of control slots a node uses may vary during network operation.

The majority of the slots in a cycle are data slots. Access to data slots changes over time, according to traffic demands. Write access to slots is controlled by slot tokens (or tokens for short). A node controller may write data into a slot only if it owns the corresponding token. The token protocol guarantees the slot access to be conflict free, which means that at most one node writes data into the same slot.

Control messages for channel establishment and bandwidth reallocation carry sets of tokens as parameters. However, a control message is 64 bits and can therefore have only a small number of parameters. This means that if a user requests a large bandwidth transfer, it may be necessary to send several control messages to create the channel. This introduces extra access delay and consumes signaling capacity. We are considering several mechanisms to decrease the amount of information that needs to be sent during channel creation and token reallocation. The first optimization in token management is to introduce block tokens. A block token is transferred in a single control message and represents a group of tokens, but can only be used for particular combinations of tokens. For instance, in the network simulations described in this paper, a block token is denoted by a slot number and an offset giving the number of contiguous slots in the group. The block token optimization assumes that the token pool is not fragmented into small pieces. The amount of small token blocks in the free pool, may be a problem and will be referred to as fragmentation.

The token protocol guarantees that a data slot can never be used by two nodes simultaneously on the bus. Sometimes this protocol is too conservative. FIG. [11] shows an example of how three tokens (A, B, and C) are reserved for three channels. Nodes are connected by bus segments and channels typically use a subset of the segments on the bus (gray color) and the rest are reserved (white color) but left unused and thus wasting shared resources. A better alternative is to let channels only reserve capacity on the segments between the sender and the receiver as the example in FIG. [12]. A single slot may in this case be used multiple times on the bus. Channel D and E are using the same slots as channel A and C but on different segments. This is referred to as slot reuse. Slot reuse enables simultaneous transmissions in the same slot over disjoint segments of the bus.

Slot reuse is a general method to better utilize shared links in ring and bus networks. The slot reuse algorithms in DQDB [11,7], Simple [19] and CRMA [20] depend on control information in the slots. Buffer insertion networks [10,8] when combined with destination release as in METARING [9] may reuse capacity of individual links and resolve eventual contention by delaying the incoming packet stream through an elastic buffer.

With slot reuse, the access scheme complexity is increased, regardless of whether it is done in hardware as in DQDB, Simple, and CRMA, or in software, as in DTM. When implemented in systems other than DTM, slot reuse also adds complex hardware to the critical high-speed path through a node and therefore increases the node delay.

To allow slot reuse in DTM the block token format is extended to include parameters describing the segment(s) it is representing. The token management protocol is also modified to avoid conflicts in the slot number dimension as well as the segment dimension. The most important assumption is that no hardware changes to the original prototype implementation were allowed or needed. The performance gain is also quite clear: on a dual-bus where source and destination pairs are uniformly distributed, it has been shown [21] that throughput may be increased by a factor of two. The potential drawback of slot reuse in a DTM network is the higher algorithm complexity and potentially higher load on the node controller and signaling channels (especially if the average channel duration is short).

Two token management schemes were evaluated. The first and simplest is to let a single node controller manage all free tokens on a fiber. This sort of centralized server mechanism has also been used in systems such as CRMA [22], where the head-end node distributes the fiber capacity to all other nodes. We configured the simulator so that for each fiber, a node one third from the slot generator is the token server. A token server will then have about the same amount of traffic on both sides.

Each time a user request arrives at a node, the node first requests tokens from the manager and then locks them throughout the channel life-time. When the user issues a request to disconnect the channel, the tokens are immediately returned to the manager. All requests are delayed during the token request and accesses are serialized through the central manager.

The distributed token manager is fundamentally more complicated than the centralized. We tried to keep it as simple as possible. In our method each node regularly broadcasts status information about how many free tokens it has. The other nodes store this information in their status tables. A node that wants more capacity consults its status table to decide from which node to request slots. The protocol on the initiating side works as follows, when a user request arrives to a node:

1. If the node has sufficiently many free tokens to satisfy the request, it allocates the requested amount of slots to the user, and starts the channel by sending a channel establishment message to the destination node, and then transmitting data using the reserved slots.

2. Otherwise the node marks its available tokens as being reserved, and then checks its status table: if the total amount of free tokens in the network is not enough to fulfill the request, the request is rejected (blocked). Otherwise the node requests tokens from nodes with unused capacity.

If one of these nodes receiving a token request does not have the requested amount of free slots, it still gives away all slots it has. In any case, it sends a response back to the requesting node. A node fulfills incoming requests in strict FIFO order.

When a node receives a response to a token request, it marks the slots it receives in the response (if any) as being reserved. When the node has received responses to all requests it has sent, it either starts the channels or rejects the user request, depending on if it has acquired sufficient capacity. If the user request is rejected, the reserved slots are marked as free.

At start-up all free tokens are evenly distributed among the network nodes and each node takes at least one of its free tokens, moves it (them) to the active state and declares it (them) to be a control slot. User requests may now be accepted and tokens can be moved between nodes on demand. When the local node contains enough tokens to fulfill an arriving user request, the request may be accepted without any token reallocation.

A weakness with this scheme is that slot reallocation is only triggered by user requests, and user requests are delayed by pending token reallocation. An optimization we have implemented to remedy this is to also perform slot reallocation in the background. This results in less need to reallocate tokens for small to medium sized requests.

Several questions need to be answered before deciding how to distribute the token pool. We address the following issues:

1. When local resources in the node are not enough to satisfy a user request, which other node should be asked for more tokens?

2. If a node asks for tokens from several nodes, how many tokens is it going to ask for and should the node reject the channel if it receives a fraction of the requested capacity?

3. If tokens move freely among the nodes, will the token pool be fragmented into small pieces and render the block token optimization scheme useless?

We decided to use status messages to distribute information about the pool of free tokens. Status message information is used to help a node choose a suitable node when asking for more resources. This method addresses the first question above.

Our scheme works as follows. Each node regularly broadcasts status information about how many free tokens it has. The other nodes store this information in their status tables. A node that wants more capacity consults its status table to decide from which node to request slots. The broadcasted status information gives an approximate view of the current state of token information, so token requests may be rejected because they were sent to nodes that no longer have tokens to give away.

Status tables are "soft" information in the sense that the system will work even if they are out of date or unavailable. They should, however, improve the success rate of reallocation procedures.

A node uses the status table to pick node(s) from which to request tokens. When the request reaches the target node the amount of available capacity may have changed and a smaller amount than requested may be returned to the requesting node, resulting in a user rejection.

This behavior results in unnecessary token transfers and waste bandwidth resources as slots are unused during the token transfer. The status message mechanism will also work less efficient when tokens are moved more frequently.

We believe that a user requests are often more flexible. It may have stringent capacity or stringent delay requirements but seldom both simultaneously. The first type with stringent capacity requirement may be more efficiently served if the request can be retried instead of rejected when there are available resources in the network. The second type, with stringent delay requirements, may be better served if a user can accept a channel with less than requested capacity instead of being rejected.

In the general case, the average number of contiguous free blocks in a node is small, due to the random movement of tokens and the varying capacity of users request. This fragmentation renders the block token optimization practically useless, and the access delay is relatively long (milliseconds) for high capacity channels. To make block allocation efficient it is necessary to reduce fragmentation of free tokens, otherwise fragmentation will be by far the main contributor to access delay for high bandwidth channels at moderate to high load. Low capacity channels will almost always have a very short channel establishment delay independent of the current amount of fragmentation. In the case of slot reuse, the fragmentation problem is even worse, as fragmentation may occur in both slot (time) and segment (space) dimensions (see FIG. 12). This is in the centralized server version a particular application of the general dynamic storage-allocation problem. In the distributed token manager most of the fragmentation is a result of using many free pools (one for each node). Two free adjacent tokens can only merge if they are found in the same node.

We have implemented a mechanism called the defragmentation scheme that tries to avoid fragmentation if possible and increases the average block size of free tokens in the nodes. The scheme is used both with and without slot reuse. Our scheme works as follows:

1. Define a home node for each token at network startup and distribute tokens in such a way so tokens sharing the same home node will always define a continuous slot range. This results in a large average token area in the token map shown in FIG. 12.

2. When two slot-consecutive tokens with the same slot or segment range exist in the free pool, merge them into a single token (sometimes a recursive split and merge operation is needed). When doing a merge, always prioritize segment merge before a slot number merge. The reason for this is that tokens spanning over just a few segments are less useful to other nodes than tokens spanning over many segments.

3. When a node gets a token request from the local user or a remote user, pick a token from the token pool using a best-fit algorithm in slot number and segment number dimension (see FIG. 12). The value of a token is calculated as the area of a token in the token map and we try to pick the token with the smallest area that fulfill the requested capacity.

4. When a node needs to request tokens from other nodes, it does not ask for small chunks from several nodes if it is possible to ask for larger chunks from fewer nodes. The status tables provide this information. Transfer of tokens is therefore more efficient, and there are fewer establishment messages and less fragmentation.

5. Free tokens are sent back to home nodes when they have been idle for a significant time or after a long transfer.

This scheme returns tokens to "home" nodes as a way to increase the probability that two consecutive tokens can be merged in the free list. If home node "gravity" is too strong, the scheme will result in less sharing of resources and unnecessary signaling. If it is too weak, fragmentation will still remain a problem.

We are mainly interested in two kinds of performance measures in this paper: utilization and access delay. Utilization is the portion of the nominal network capacity that is actually used for data transfer, and is a measure of the efficiency of the network. Access delay is the time from the arrival of a user request to the sending of the first data of the request, which we think is an important measure for how well computer communication traffic can be supported.

There are two main factors that influence utilization in DTM. First, each node is assigned signaling capacity in the form of control slots, which means that there are fewer slots available for data transfer on a bus with many nodes, given a fixed link capacity. Secondly, token reallocation incurs overhead since while a slot token is being reallocated between nodes, the corresponding slot cannot be used for data transfer.

Access delay depends mainly on the load on the control slots, and on how many control messages that need to be sent to establish a channel. The access delay is typically a summation of several delays (and typical values): Node controller processing delay [5 us], delay in finding and allocating free tokens [100 us], waiting for the first available control slot to pass [50 us], and finally waiting for the first allocated data slot to be filled with user data [62.5 us]. In addition, messages are delayed in queues at the input to node controllers waiting to be processed. In the simulations presented below, the average delay is up to a few hundred microseconds.

In the simulation model, each transfer starts with the arrival of a new "packet" of information. The node controller tries to allocate resources for the transfer, transmits the packet and finally releases the channel. This is a simplification of the mechanisms in a real system, where channel set-up, data transfer and channel teardown are independent operations initiated by the user. For example, a user that knows that a transfer is about to take place may "hide" the channel establishment delay by requesting a channel in advance, so that it is already established when the transfer starts. Between a setup and teardown, the capacity of the channel is completely reserved for the user. The most straight-forward use of the channel is for a single transfer, such as a file transfer or a video transmission. Depending on the characteristics of the application, it is possible to optimize the usage of the channel. For instance, a channel may be used to transfer sequences of higher level messages such as ATM cells or IP packets. If it is a multicast channel, messages to different destinations can be multiplexed onto it. This means that each message will reach every receiver on the multicast channel and receivers must be able to filter messages. An alternative solution is to create and destroy a channel for each message, but reserve the tokens between messages so that the tokens are readily available for the next message in the sequence. We do not incorporate this type of user behavior in the simulations, since they are optimization for particular applications. Instead we focus on how the network performs without user level optimization.

The sender may start sending data as soon as the resources are allocated, even before the receiver receives the channel establishment message. This is called fast channel establishment. The receiver will eventually respond with a control message to accept or reject the channel.

User requests have the following parameters:

Packet size which is the amount of user data transferred between channel establishment and channel release. We simulate packet sizes from a few kbytes up to a few Mbytes.

Requested capacity for a channel, which is the number of slots that a node tries to allocate. For all the simulations in this paper the requested capacity is fixed to 40 slots or 20.48 Mbit/s.

Minimum acceptable capacity. A node blocks a request if it cannot allocate this number of slots. This is normally set to 40 or 20 slots (100% or 50% of requested capacity).

Source address.

Destination address.

The source and destination addresses are generated randomly (all nodes with the same probability) and user inter-arrival times are exponentially distributed. The simulations investigate the effect of signaling capacity and slot reallocation overhead on utilization, channel set-up delay, and blocking. We simulate a topology with the following characteristics:

A dual bus network with 100 nodes. Even though it is theoretically possible to connect many more nodes to a bus, we think that management of networks with more than 100 nodes on a bus may be infeasible. With 100 nodes the capacity sharing is significant enough to exercise and test the token management protocol.

The capacity of each bus is 6.4 Gbit/s. We believe such a capacity is realistic for what is realizable within a year or two; 2.4 Gbit/s optical links have been available for a few years, and 10 Gbit/s links have been announced to appear soon on the market. 6.4 Gbit/s corresponds to 100 MHz slot rate, which is the rate at which the slot processing MAC hardware would operate. 100 MHz is attainable with current CMOS technology.

The total signaling capacity is the same for all nodes, but the slots are partitioned between the two fiber directions proportionally, depending on where the nodes are located on the bus. The closer a node is to the slot generator the more control capacity is needed. The sum of the control capacity on both buses will however be the same for all nodes. In the network with two token servers, the servers have more control capacity and higher processing capacity than the other nodes.

The length of the bus is 10 km, which gives a large enough network that the effects of propagation delay are not negligible. We further study the effects of propagation delay in the simulations in FIG. [19] and FIG. [21], which use bus lengths of 1 km, 10 km, 100 km and 1000 km.

Two different token management schemes are simulated: an asymmetrical scheme where all the tokens on one fiber are managed by a single token server and a symmetrical scheme where each node controller manages a small piece of the global token pool.

When analyzing the performance of the DTM dual-bus network, the issue of maximum theoretical performance must be addressed and compared to the simulated performance. The maximum theoretical performance is also used in this paper to compare the different schemes and implementations we are evaluating.

The maximum throughput of a dual-bus system without slot-reuse, can be defined as twice the link capacity, given that both fibers receive the same traffic. In a system with slot reuse the system throughput also depends on the source destination distribution. To obtain this throughput for the dual-bus we used a Monte Carlo simulation where source and destination addresses were uniformly distributed (see FIG. 16a). In FIGS. 16b, performance of a DTM network is included. The DTM network uses a centralized token manager and users request to transfer 4 Mbyte of information each time. In this system, signaling capacity is not a bottleneck and utilization is found to be close to the ideal case. Real traffic behaving like this is bulk-data transfers and audio/video streams. The small differences that are shown are results of: First, some capacity is in DTM used for control slots lowering the available number of slots to be used by data transfers. Second, random generators for the DTM simulations do not generate exactly the same amount of traffic in upstream and downstream directions, and may result in blocking in one of the directions when capacity is available in the other. Third, during channel establishment resources may be locked unused momentarily, wasting some capacity.

In the case of a central token manager the two managing nodes need more signaling capacity than other nodes (we assign 8 times as many control slots to a server node than to other nodes).

Figure 17A:
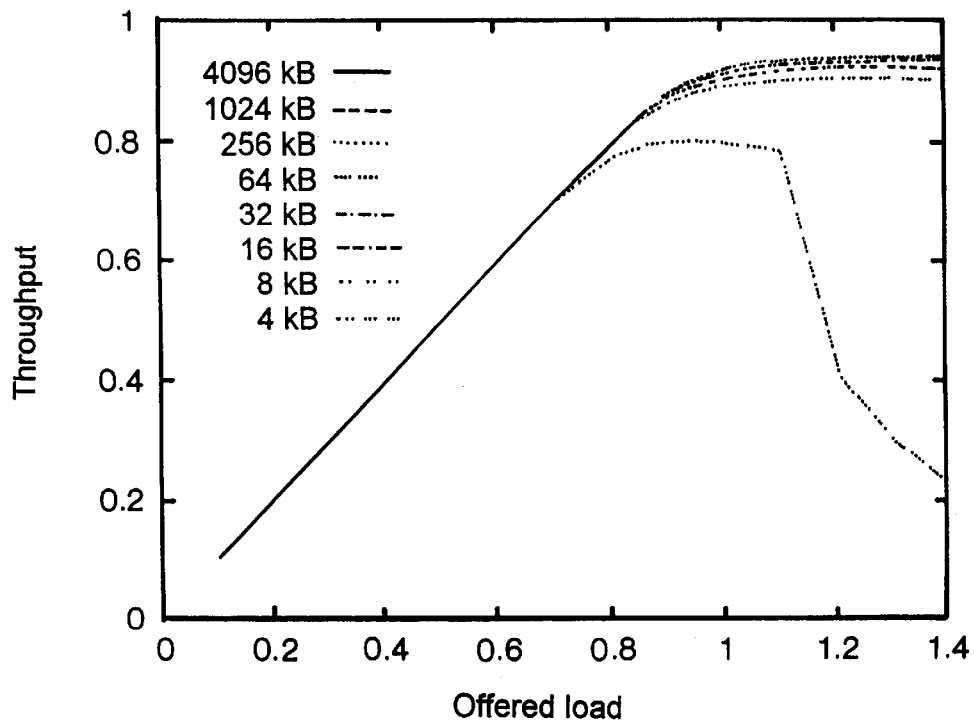
FIGS. 17a/17b illustrate a central token manager for throughput and access delays according to the present invention.
Figure 17B:
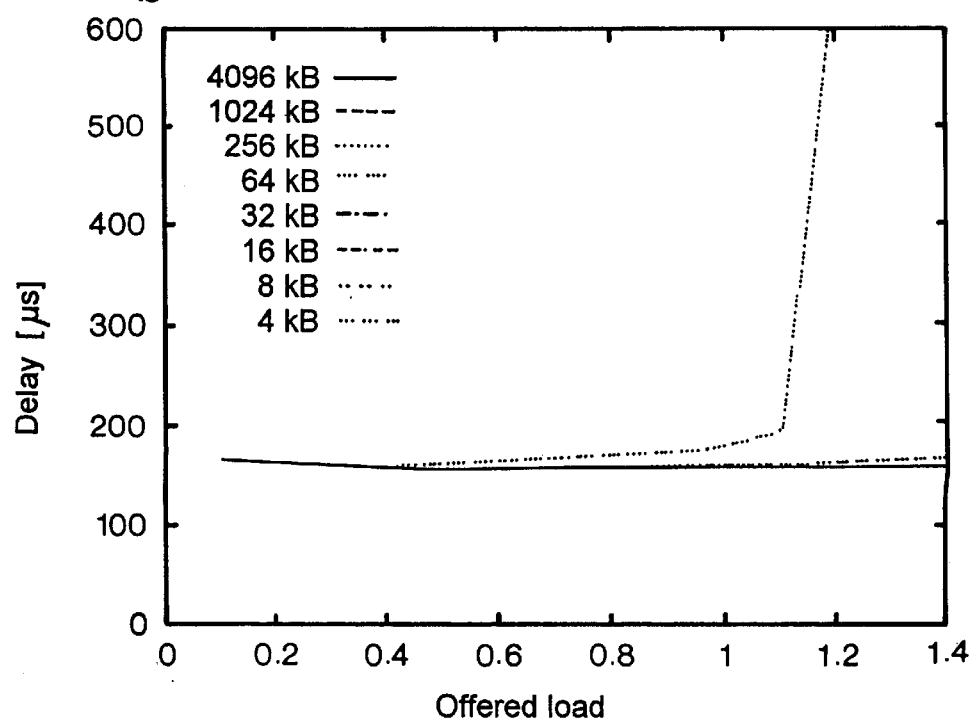

Results of the first set of simulations are presented in FIGS. 17a/b. Users request 20 Mbit/s channels, inter-arrival times are exponentially distributed (generated by a Poisson process) and the simulations are performed with different packet sizes. If the full capacity of the channel cannot be allocated, the request is rejected and tokens are returned to the token server. Packet sizes vary from 4 Mbyte to 2 kbyte, at which point we begin to see throughput degradation.

Throughput degradation may occur if processing capacity in nodes or control channel capacity is too small. The server nodes may be especially overloaded. The result is that queues containing control messages start growing very big. The control tokens represent unused capacity, and therefore the throughput is degraded.

In the 2 kbyte per channel simulations and load higher than 1.1, the control capacity is the limiting factor and if more control slots are added, 2 kbyte and even smaller packets can be more efficiently supported.

Figure 18A:
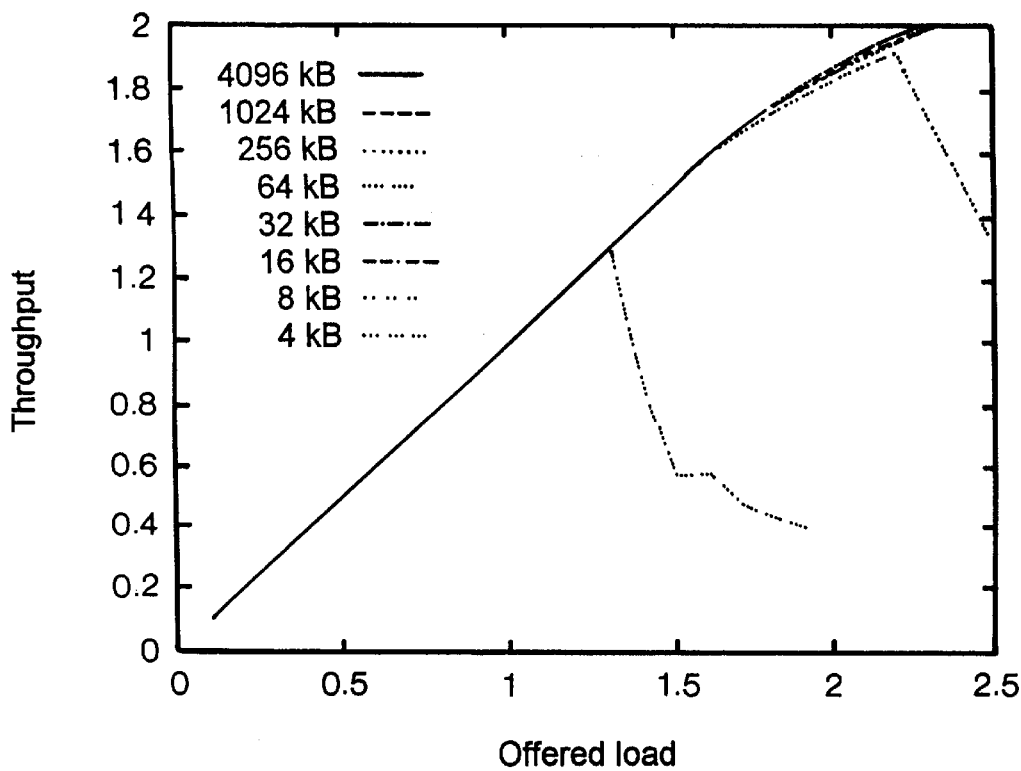
FIGS. 18a/18b illustrate a central token server and slot reuse for throughput and access delays according to the present invention.
Figure 18B:
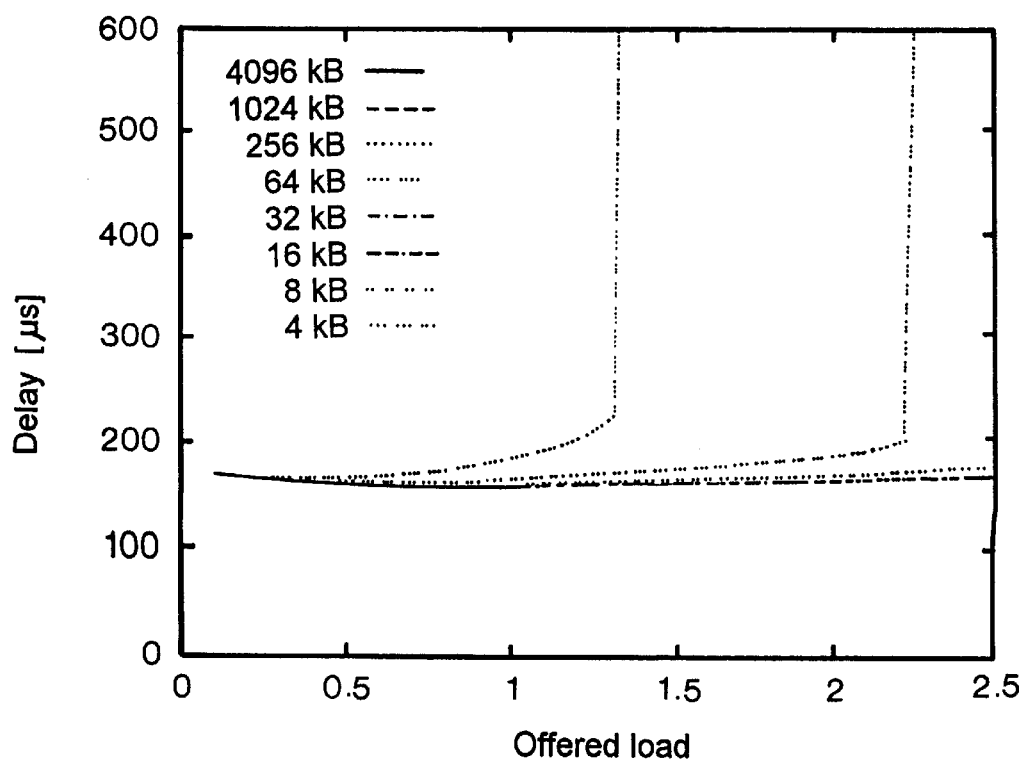

The next set of curves, in FIGS. 18a/b, show how the slot reuse mechanism improves the performance of the system. Throughput increases by almost a factor of two before any significant number of channels are rejected. The uniform source and destination distributions of channels limit the amount of increased capacity gained by slot reuse. It has been shown that if the source and destinations are generated evenly, as we do, throughput may be doubled on a dual bus [21]. In the simulations it may also be seen that beyond an offered load of 2.5 we may actually get throughput higher than 2.0. This level of throughput, however, cannot be reached without some channels being rejected. The channels with the highest probability of being rejected are the ones that use many slots or segments. Therefore the system "filters" less greedy user requests and throws away the rest. This is normally not an acceptable behavior and we therefore do not investigate this any further.

Throughput degradation occurs at an offered load of 1.3 with the 2 kbyte transfers. Even if we have enough resources in the token server, we cannot establish and destroy, channels fast enough as the control channel is congested. Further, we also see a throughput degradation of the 4 kbyte simulations at an offered load of 2.2, for the same reason.

It may be concluded from the simulations in FIG. [18] that the slot reuse mechanism almost doubles the system throughput with only minor changes to the centralized token protocol, as long as the control and server processing capacity is not a bottleneck. From the curves it can also be seen that access delay actually decreases when the load increases from 0.1 to 0.5. This is a result of how slots are assigned to a channel and is not related to the token request procedure. The time it takes to request tokens from the server is strictly increasing with the load.

Figure 16A:
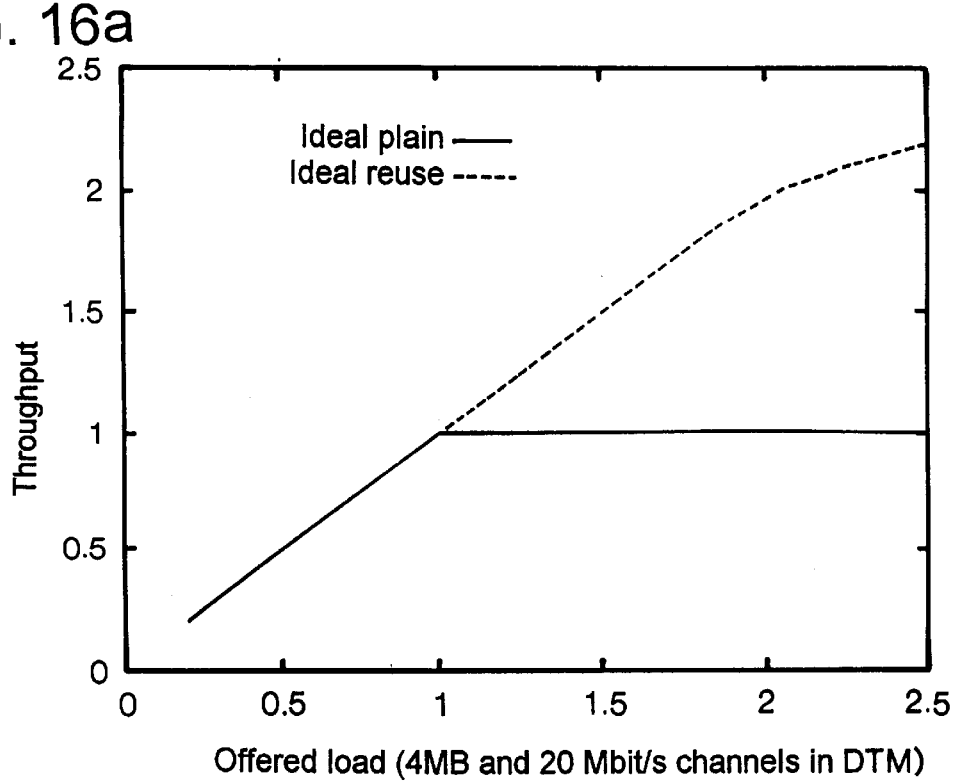
FIGS. 16a/16b illustrate a theoretical dual-bus and DTM throughput according to the present invention.
Figure 16B:
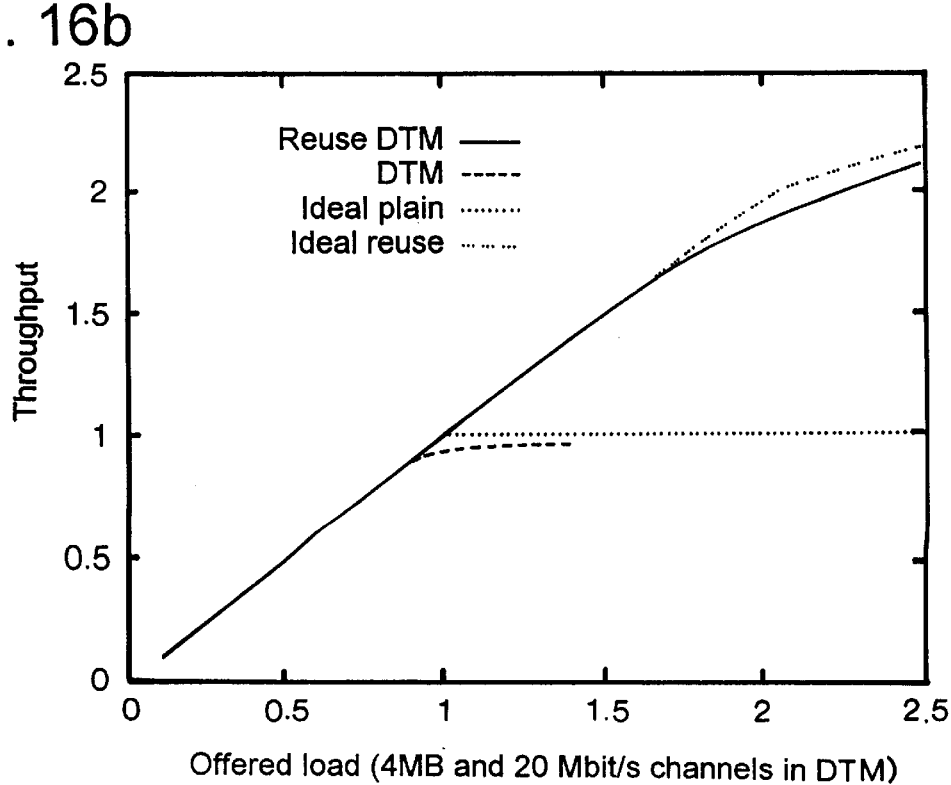

When comparing the DTM performance in FIGS. 18a/b and the theoretical values in FIGS. 16a/b, we see that even short bursts (a few milliseconds duration) can be supported efficiently.

When a single token server is used, each channel establishment requires a token to be requested from the server. If the length of the bus is increased, the token request will take a longer time and may therefore also limit the throughput and increase the access delay.

Figure 19A:
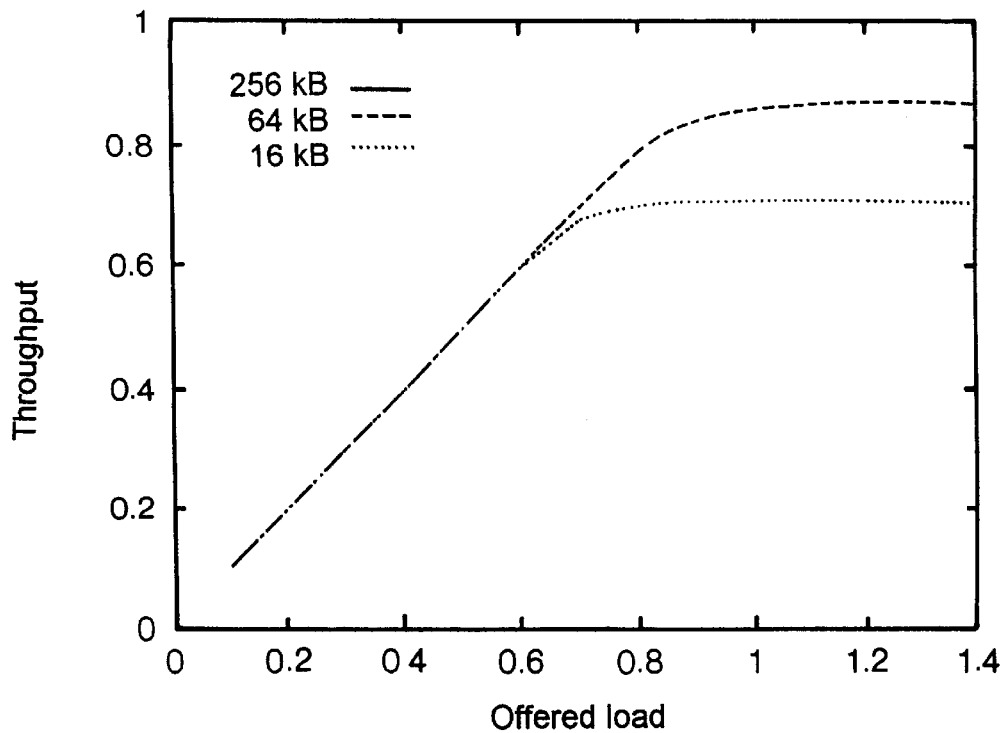
FIGS. 19a/19b illustrate a thousand kilometers long bus with a central token server for a throughput and access delay according to the present invention.
Figure 19B:
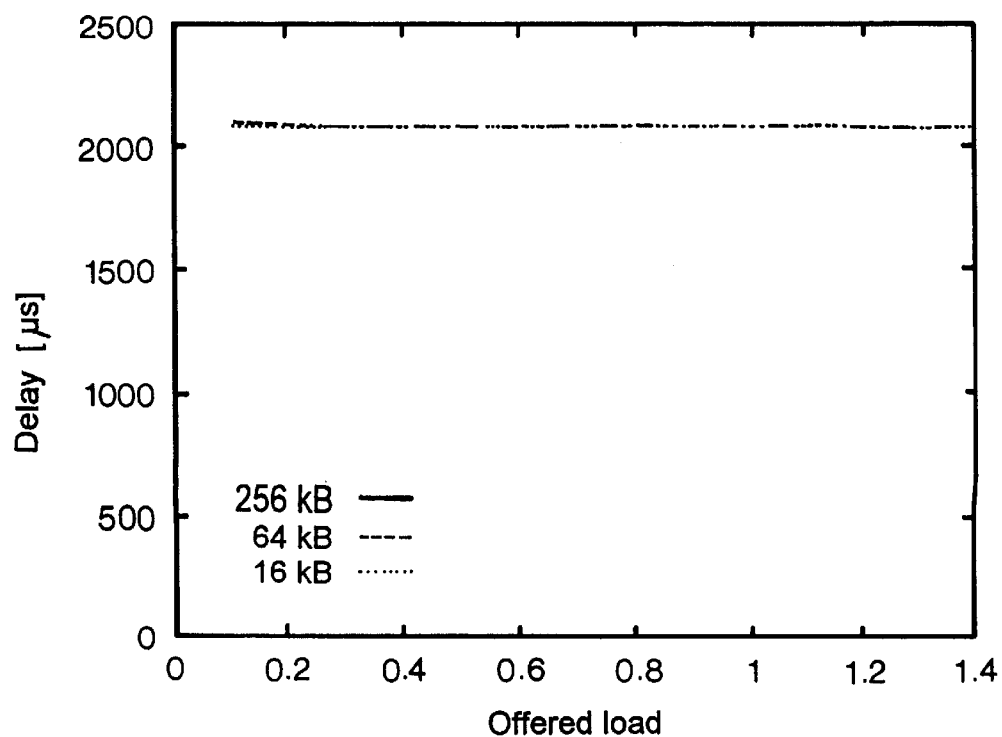

In FIGS. 19a/b we increased the length of the bus by a factor of 100 to 1000 km (node to node delay is now 50 us). Both access delay and throughput may now be limited by the round-trip latency to the token server.

Access delay in this case depends on the distance to servers, but is independent of the transfer size. Throughput depends strongly on the average transfer size as the establishment phase is amortized over the data transfer phase. Channels transferring large amounts of information such as 256 kbyte with a duration of one tenth of a second are still efficiently supported when the bus length is 1000 km.

A centralized token manager has several benefits. Clients may be simple as they only contain state information related to their own opened channels. Slot reuse is also simple and efficient, as the slot server has all of the free tokens to choose from when trying to satisfy a user request. The server may also implement other policy related functions such as admission control and fairness. The fragmentation of the free token pool in the server is normally very modest, resulting in very few connection establishment messages per channel even for high capacity user requests.

There are also drawbacks. A user that frequently establishes and destroys channels may introduce excessive signaling by always returning tokens after use, but then requesting the tokens again within a short time period. The processing capacity of the server node may get overloaded if there are many nodes on the bus or if the average packet size is very small. If the media length is very large relative to the product of bit-period, bits-per-packet and media velocity, the round trip time to the server may also limit performance. Finally, the server node contains state information that all nodes depend on to create channels. A server node failure may therefore affect all the nodes.

In this section we simulate and investigate the properties of a fully distributed token manager.

For the distributed token manager, new mechanisms and parameters were added as described earlier.

Figure 13A:
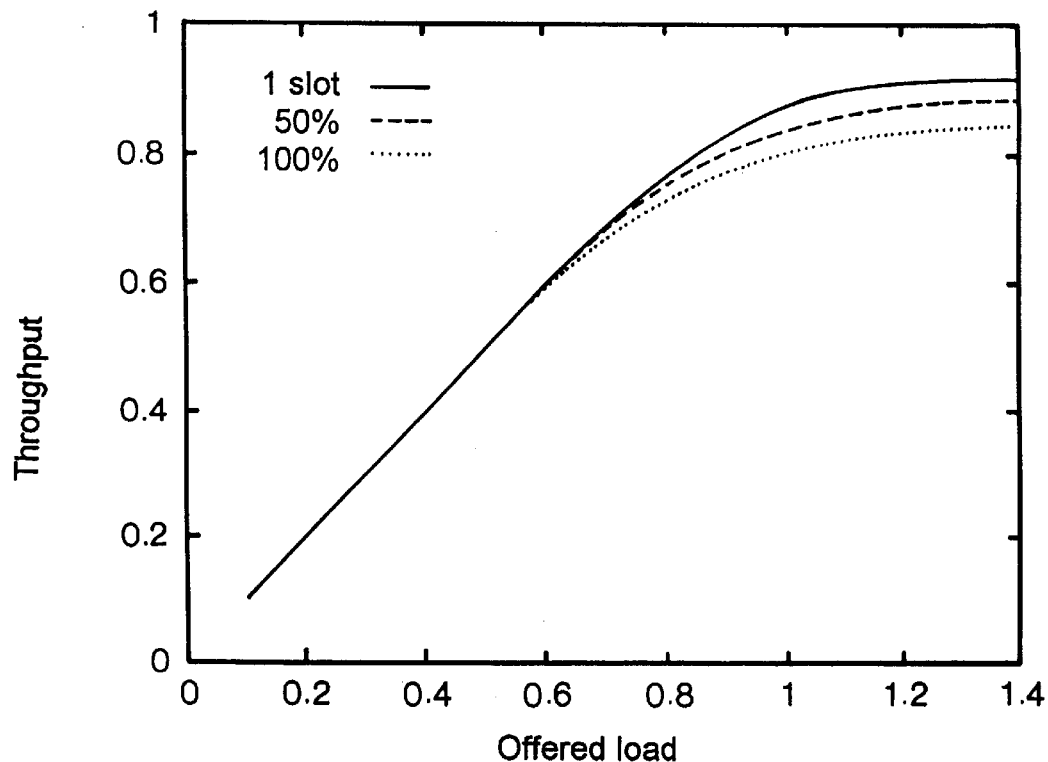
FIGS. 13a/13b illustrate a distributed token server for throughput and access delays according to the present invention.
Figure 13B:
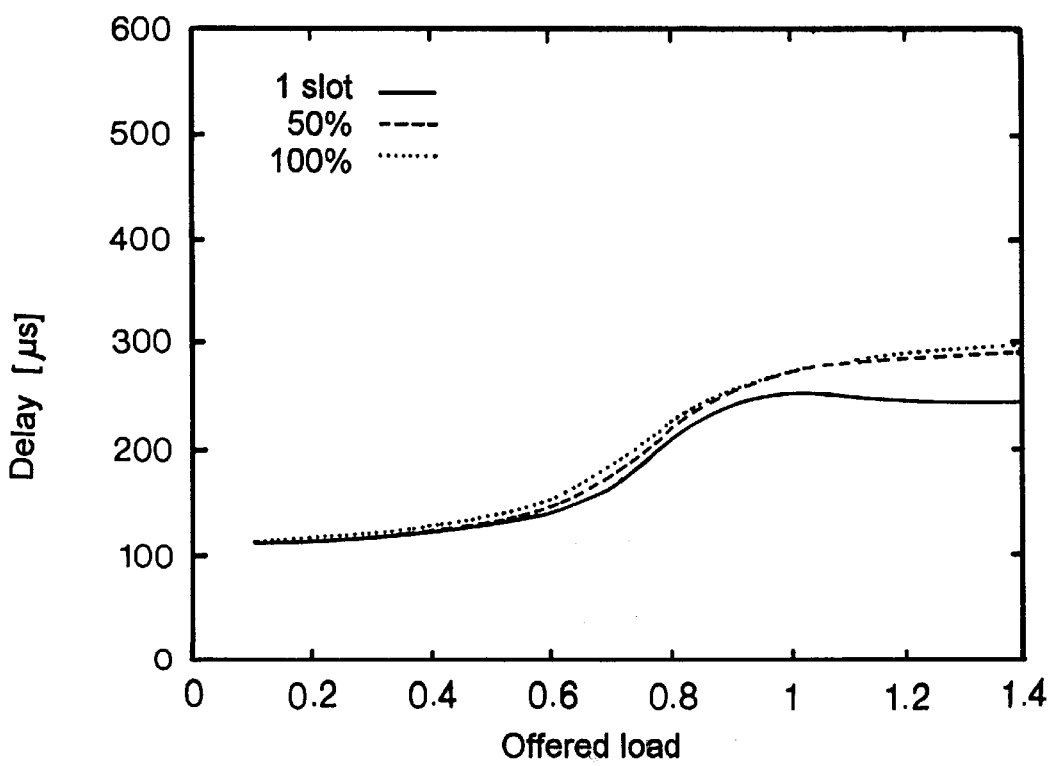
Figure 14A:
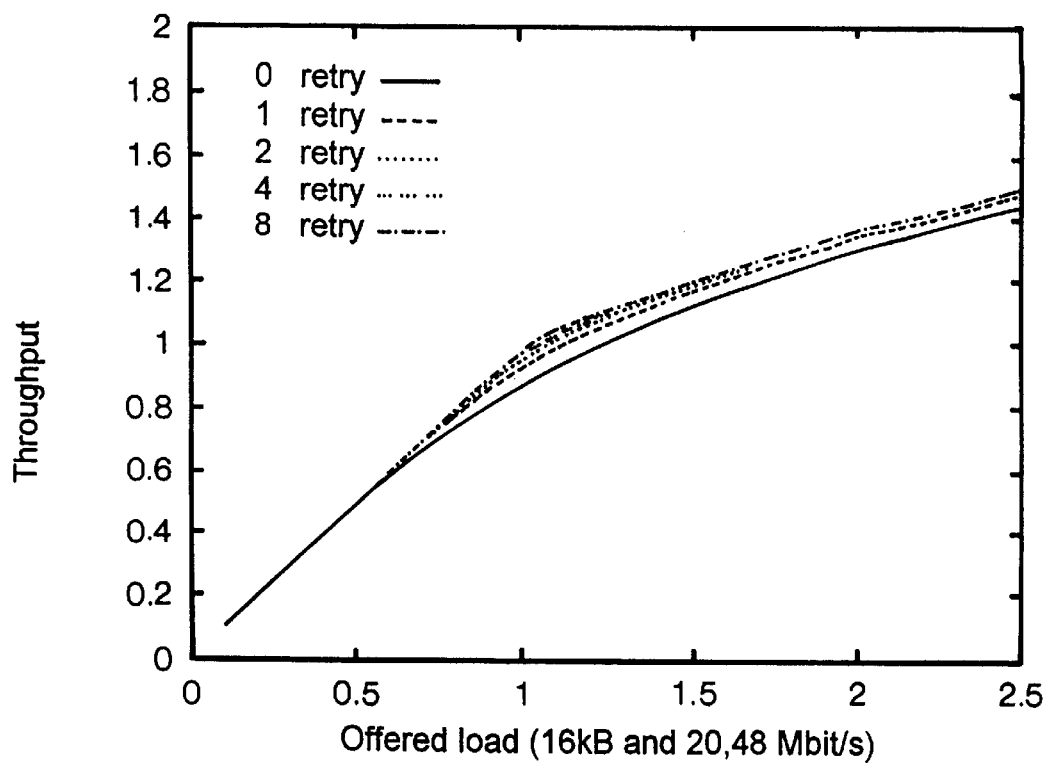
FIGS. 14a/14b illustrate that a user retry increases the utilization (16 kilobyte transfer) for throughput and access delays according to the present invention.
Figure 14B:
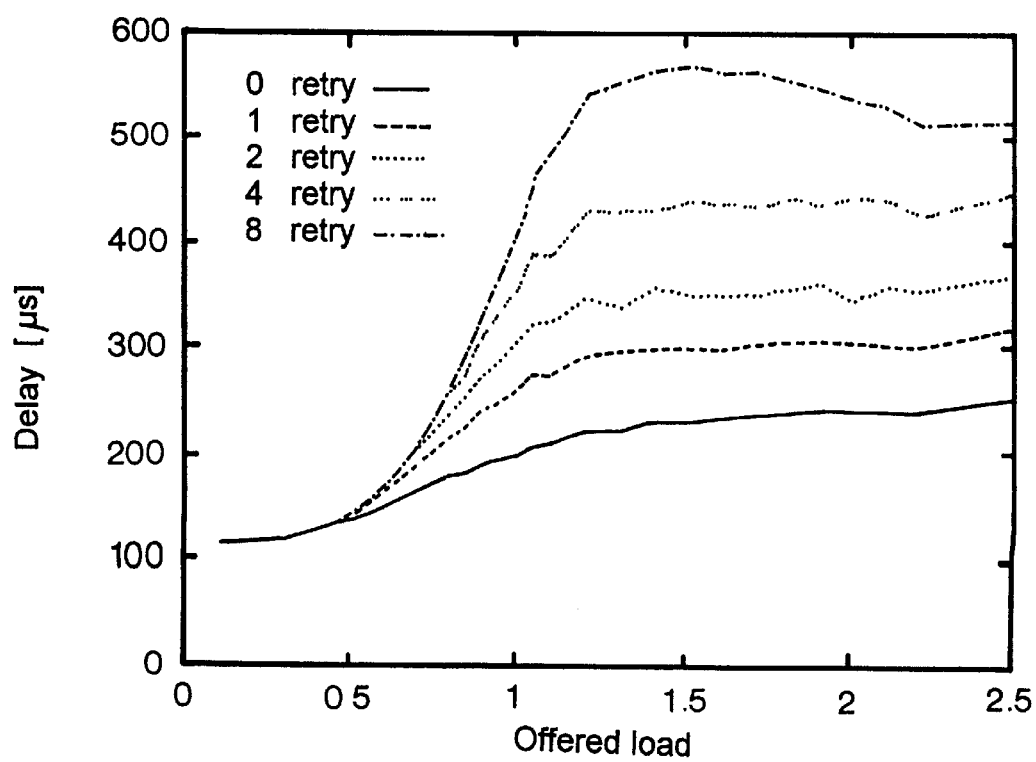

In FIGS. 13a/b the performance of small (16 kbyte) user requests with various minimum acceptable capacities 100% (40 slots), 50% (20 slots), and 5% (1 slot) are shown. A lower average minimum acceptable bandwidth will result in higher utilization. In FIGS. 14a/b we show performance that results if the user (requesting a 16 kbyte data transfer) retries up to 8 times before we finally block the request. Utilization increases (and blocking decrease) at the cost of more signaling and longer delay.

Clearly, the benefits of a flexible user request policy are lower probability of being rejected and higher overall throughput. A user that has strict demands on the capacity for a channel may retry until enough capacity is allocated, but another may rather accept a channel with less then the requested amount. For the rest of the simulations presented here, we define the minimum acceptable bandwidth to be 50% of the requested capacity.

The next mechanism to be analyzed is the defragmentation scheme described earlier. To evaluate the scheme, we did a set of simulations, which used three different simulations A, B and C.

Simulation A was configured to have no fragmentation at simulation start time and to use the defragmentation scheme described above. B started with maximum fragmentation. All tokens had a single slot, and no tokens were in their "home" nodes before the defragmentation mechanism was turned on. Finally, simulation C was without the defragmentation mechanism and with the pool having maximum fragmentation. In all cases, slot reuse was turned on and the load was defined to be 80%.

Figure 15:
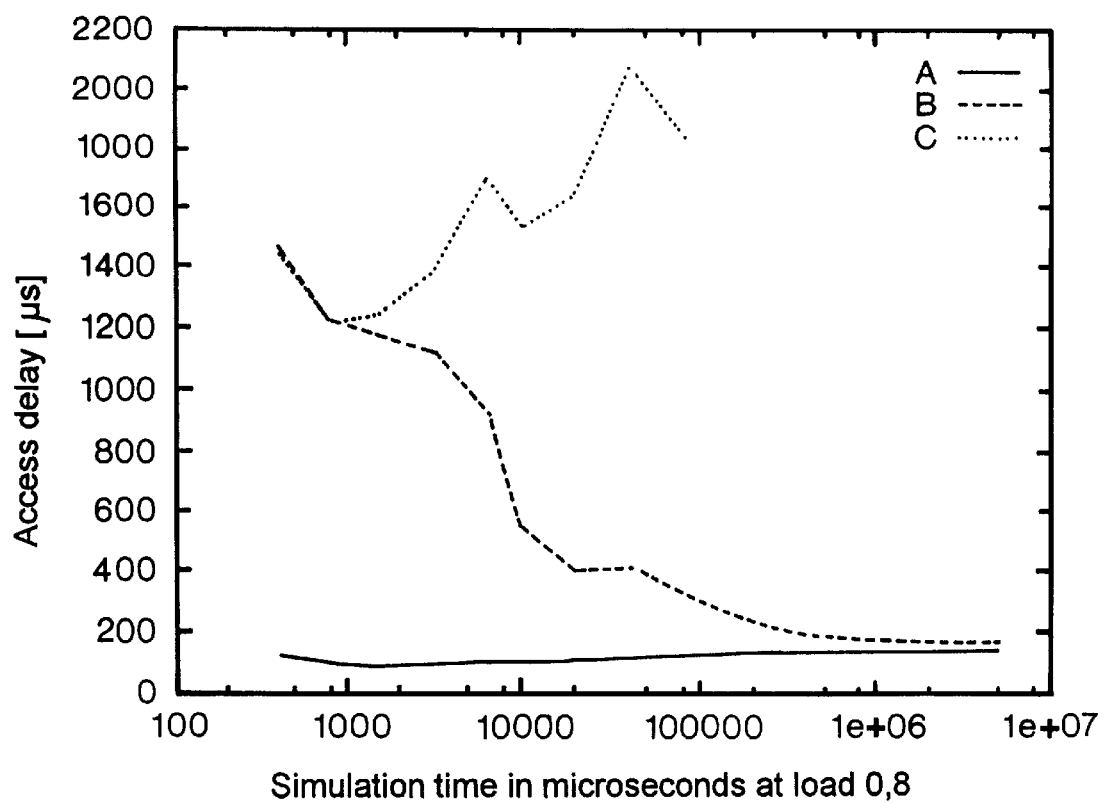
FIG. 15 illustrates a defragmentation access delay as a function of simulated time according to the present invention.

In FIG. 15 we plot access delay as a function of the simulated time for each of the simulations A, B and C. Simulation C start with a long access delay and it increases when the signaling channels gets congested by control messages and the message queues grow. Simulation B starts just as bad as C but when blocks are merged due to the defragmentation scheme the access delay decreases fast. After 10 milliseconds the average access delay is below 500 microseconds and after one second simulated time it almost merges with the B curve representing the simulation started without any fragmentation and using the defragmentation scheme.

The time it takes to increase the average token size depend on the amount of free capacity in the network and therefore also on load. This set of simulation results verifies that the defragmentation mechanism clearly improves the access delay and also makes the block token optimization meaningful.

When evaluating the performance of the distributed token manager with slot reuse and defragmentation, we used the same traffic and parameters as described earlier, but used a policy whereby requests are accepted if 50% of the requested capacity can be allocated.

Figure 20A:
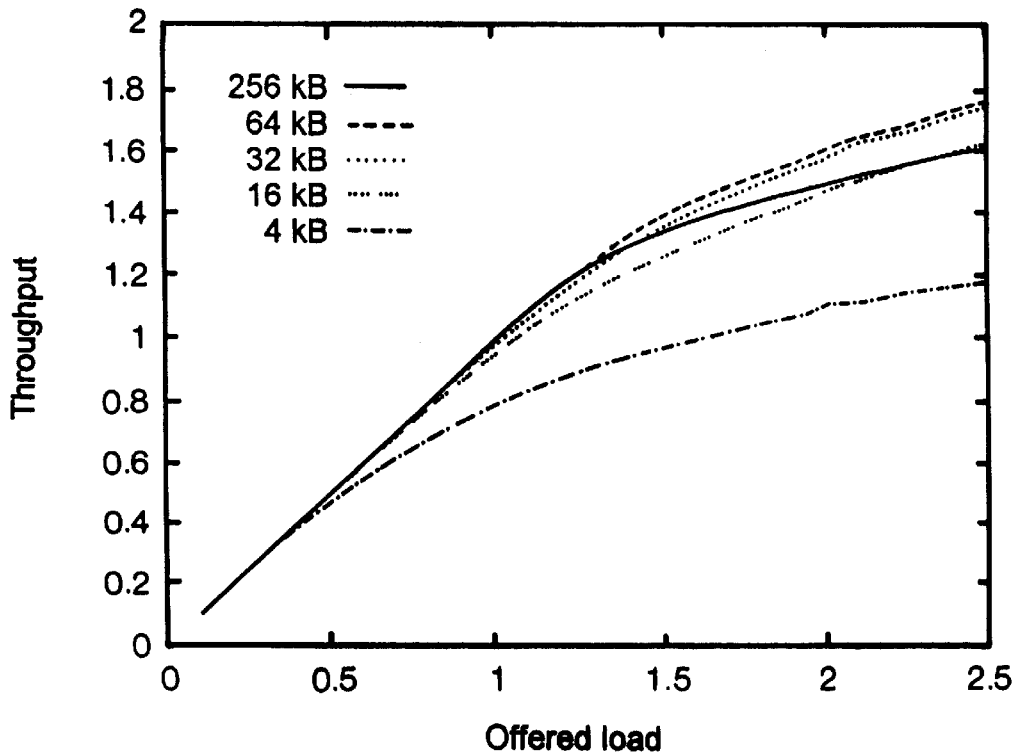
FIGS. 20a/20b illustrate a utilization and access delay for a distributed token manager according to the present invention.
Figure 20B:
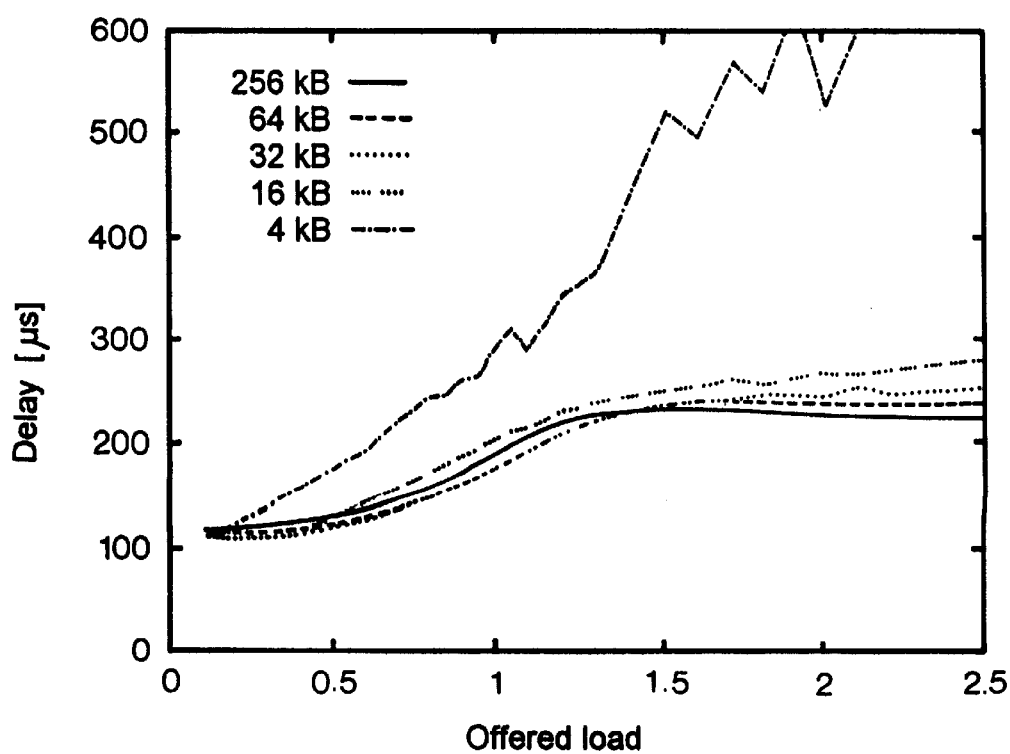

The results presented in FIGS. 20a/b are from the simulations with slot reuse, a fully distributed token manager, status messages, and the defragmentation scheme. The system performs better than any system without slot reuse, but not as good as the centralized system described earlier. Compared to the centralized scheme (see FIGS. 18a/b) blocking is higher and starts at a lower load. From the plotted throughput curves in FIGS. 20a/b it can be seen that the performance of the system increase when the transfer size increase for all curves but the 256 kbyte transfer size curve. This degradation was unexpected and is not normal in a circuit switched system where larger transfers incur less control overhead and therefore should perform better.

We found that this anomaly occurs with slot reuse and at high load. The problem was traced back to the the status message mechanism originally developed for a system without slot reuse. Status messages only includes information about tokens that are not segmented which results in less efficient use of segmented tokens. User requests are also immediately blocked when the status tables indicates that there are no free capacity in the network. Status messages containing information that the free capacity in a node was decreased are delayed during channel establishment in contrast to messages indicating increasing capacity which are transmitted with short delay. This mean that when channels are established frequently the status tables indicates a too high value and the ratio of requests that are immediately blocked is lower. Consequently a system receiving short and frequent transfers and using the described status message mechanism may actually sometimes perform better than a system receiving few but large transfers!

Figure 21A:
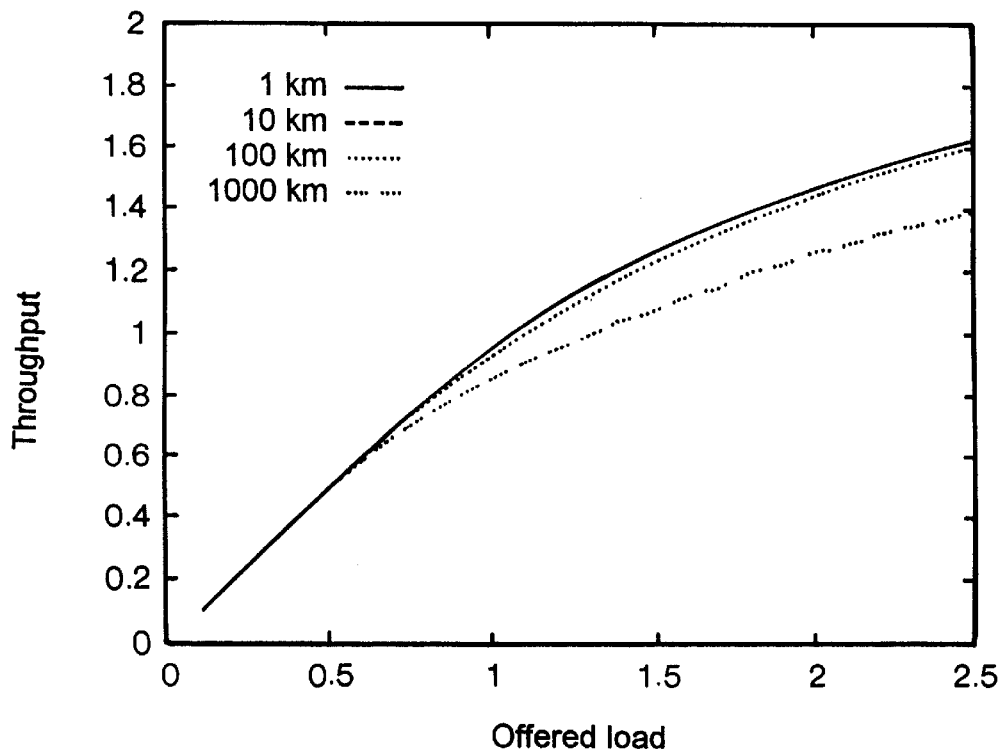
FIGS. 21a/21b illustrate a one to thousand kilometers long bus with a distributed token server for a throughput and access delay according to the present invention.
Figure 21B:
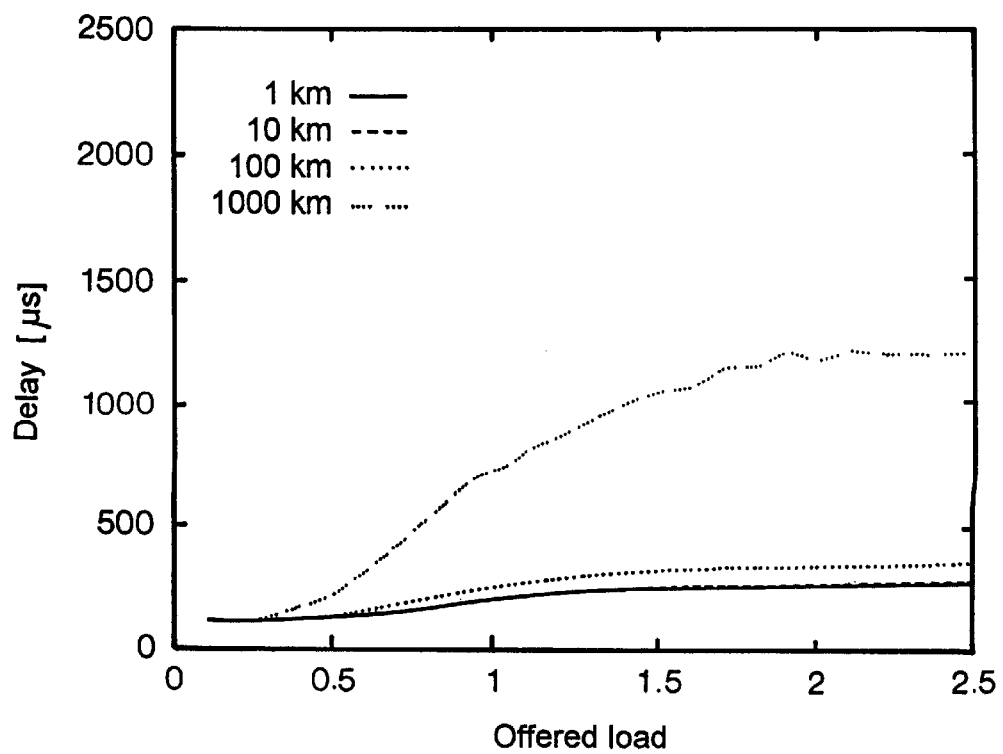

The throughput and access delay of the distributed token manager with varying bus lengths from 1 km to 1000 km are presented in FIGS. 21a/b. A 16 kbyte packet is sent between establishment and tear-down of the channel. The 1 km and 100 km buses give about the same throughput and access delay as the 10 km bus, because the latency introduced by using a 125 us cycle dominate over the time of flight latency in the system. For the 1000 km long bus, we see that the access delay is found to be shorter than in the 1000 km system using a centralized token server (see FIGS. 19a/b). At low load tokens are found very close and access delay is about the same for all systems independently of bus length. Even at very high load the access delay is about 1 millisecond shorter than it is in the centralized system in FIGS. 19a/b.

The centralized token manager system will have the same performance almost independently of the traffic as long as processing and signaling are sufficient. To evaluate the distributed system, we decided to use two other traffic generators. First, we use a generator that simulate user requests arriving in bursts: when a request arrives, a new request is generated to arrive with 90% probability after 200 us. The result is that bursts of requests arrive to nodes and force high temporal locality of source addresses. Second, to generate traffic more similar to client-server behavior we increase the amount of traffic arriving to 5 server nodes.

Figure 22A:
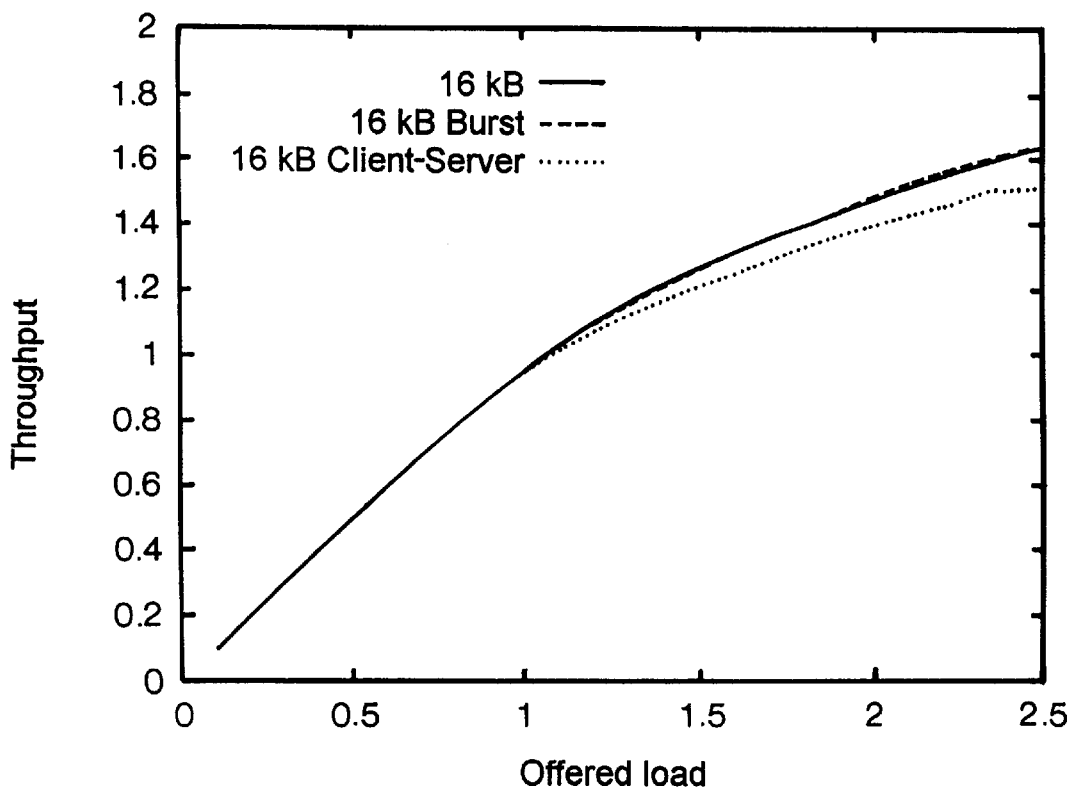
FIGS. 22a/22b illustrate a distributed token server for a throughput and access delay according to the present invention.
Figure 22B:
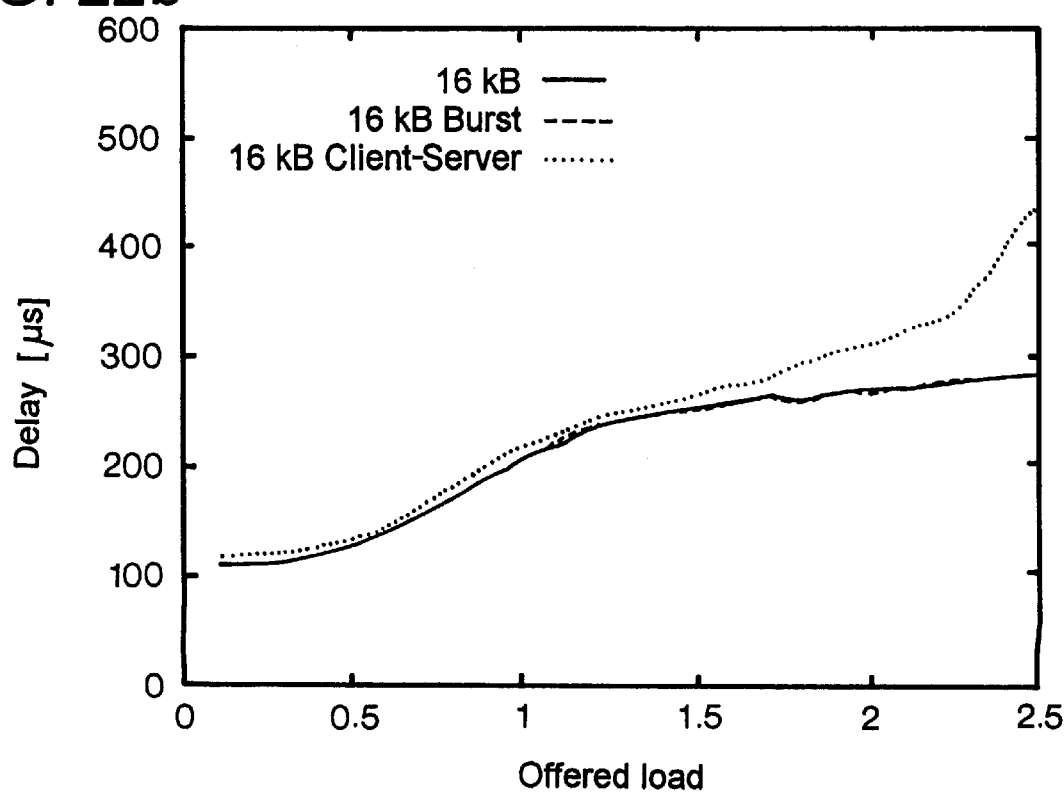

In FIGS. 22a/b we present throughput and access delay performance of the distributed token server system. The results in show that system performance is not really affected by bursts. The arriving bursts arrives and is processed without increasing the access delay. In the case of client-server traffic performance degrades due to the higher load on the signalling channel and the node controller for the server nodes. It may therefore be advantageous to increase the processing and signalling to capacity for servers.

It is clear that the distributed implementation have several benefits compared to the centralized token server: The nodes may share the processing load, there is less need for high-performance token servers, redundancy may be higher and access delay may be shorter for low capacity request. It also scales to longer busses. The drawback is higher blocking. It is also clear that the status message and status table mechanism must be changed to avoid unnecessary blocking when slot reuse is allowed.

We have shown that the DTM fast circuit switching protocol performs well in a dual-bus shared media environment. Two slot (token) management schemes are analyzed. The centralized scheme perform closest to the ideal protocol and is relatively simple.

The distributed scheme is more sensitive to user behavior, relies on status information that is broadcast frequently, and needs a defragmentation scheme. The main advantage with the distributed scheme is that it efficiently decouples the access delay from the round-trip time on the bus.

One result is that the status message scheme does not work well with slot reuse and future work is to redesign it. Further work is to evaluate a scheme that combines the distributed and the centralized token manager using a small set of token server nodes.

The conclusions are that channel establishment overhead can be very small, resulting in high utilization even for small (a few kilobytes) transfers. Access delay is found to be a few hundred microseconds even at high load. The slot reuse scheme can increase the throughput performance by a factor of two and can be implemented without introducing any extra hardware in the nodes.

The network is not limited to a dual bus, and can be implemented in many topologies, e.g., ring topology and single bus topology with an arbitrary number of network nodes. The transmission medium can, in addition to an optical fibre, be a coaxial cable or another medium with high capacity. In the description, the transmission medium will be referred to as an optical fibre. The capacity of the DTM dual bus is, in the implementation described, divided into cycles of 125 microseconds. The cycles are further divided into 64 bit time slots. The invention is not restricted to a DTM network with these figures, and can be used in networks with cycles and time slots of arbitrary sizes.

The performance gain obtained by the slot reuse mechanism is obvious: on a dual bus where source/destination pairs are uniformly distributed, the throughput has shown to increase with a factor of two. The performance gain can be even higher for other network topologies; in e.g., a dual ring topology with uniformly distributed source/destination pairs the throughput can be increased with a factor of eight.

A consequence of the resource management mechanism in DTM is that the channel establishment time may increase when creating communication channels of high capacity.

This trade-off can be justified: the types of traffic that requires a low medium access delay are normally less sensitive to the capacity that can be allocated for the data transfer and therefore such traffic types can be accepted without involving the reallocation mechanism. For transfers that require higher network capacity, the access delay may increase and the resource reallocation mechanism will often be used. On the other hand, such transfers are likely to be less sensitive to access delay.

The simulations described above have proven that the fast circuit switching in DTM networks behaves well in a shared medium of dual bus topology. Two different time slot management algorithms have been analyzed and they both behave well and can take advantage of time slot reuse. The centralized method gives the results that are closest to the ideal case, and the method is easier to implement than the distributed method. The distributed method is more sensitive to user behavior and must therefore rely on status information that is transmitted regularly between network nodes. The method also relies on the defragmentation mechanism to decrease the number of control messages that need to be exchanged during the channel establishment and for the resource reallocation procedure. The distributed method, together with the defragmentation mechanism, gives better performance than the centralized method over long distances.

It is also possible to combine the centralized and the distributed methods by using a set of token servers for the medium. In addition, the channel establishment overhead can be kept very low, which results in high utilization even for small (a few kilobytes) transfers. The access delay is in the order of a few hundred microseconds, even during high network load. The time slot reuse mechanism can increase the performance with a factor of two without equipping the net-work nodes with additional hardware. When using the time slot reuse mechanism, it is even more important to use the defragmentation mechanism, since fragmentation can occur both in the time domain and in the medium segment domain.

The description above deals specifically with a centralized system that is characterized in that only one home node exists for all tokens and in that free tokens are always returned to the home node as soon as possible. In the fully distributed system, all nodes act like home nodes (server nodes) and the tokens are distributed between the home nodes. Free tokens are not returned to their original home node when they are released after a data transfer. The tokens are not moved to another node unless another node request them. One feature of the defragmentation mechanism is that it allows tokens to be returned to their home nodes after a certain amount of time (e.g., if the tokens have been unused for a so called "idle time" or when the tokens have been away from their home node for a certain time, the so called "last home-time). One important term is the "gravity"—low gravity means that the time before returning the tokens is long and high gravity means that the time before returning the tokens is short. The previously described centralized system has an infinitely high gravity (time=0) while the distributed system without defragmentation has a gravity=0 (infinite time before returning the tokens).

Figure 24:
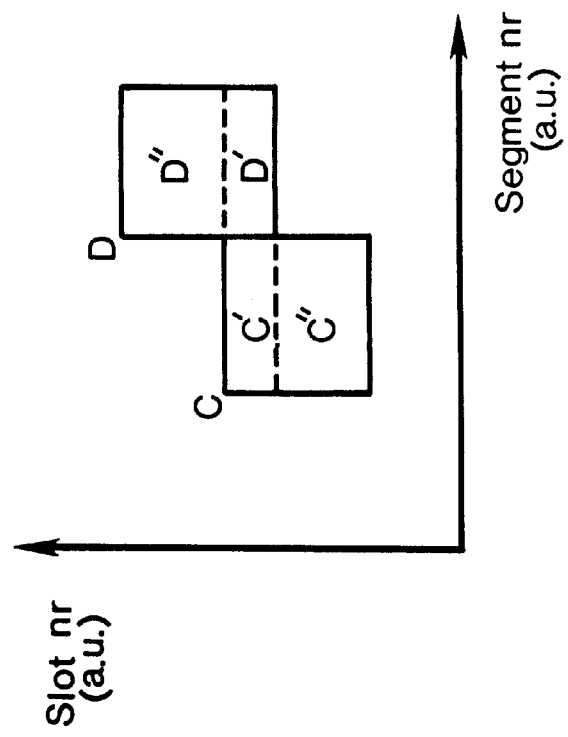
FIG. 24 illustrates a slot-segment map according to the present invention.
Figure 23:
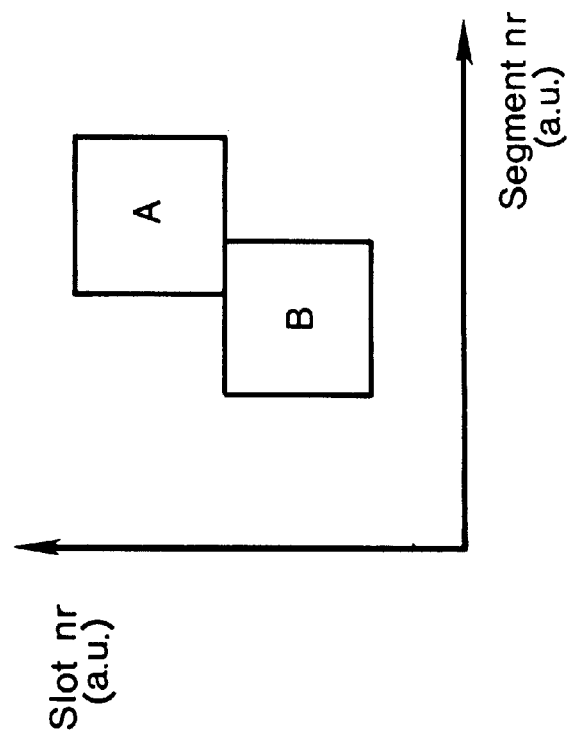
FIG. 23 illustrates a slot-segment map according to the present invention.
Figure 25:
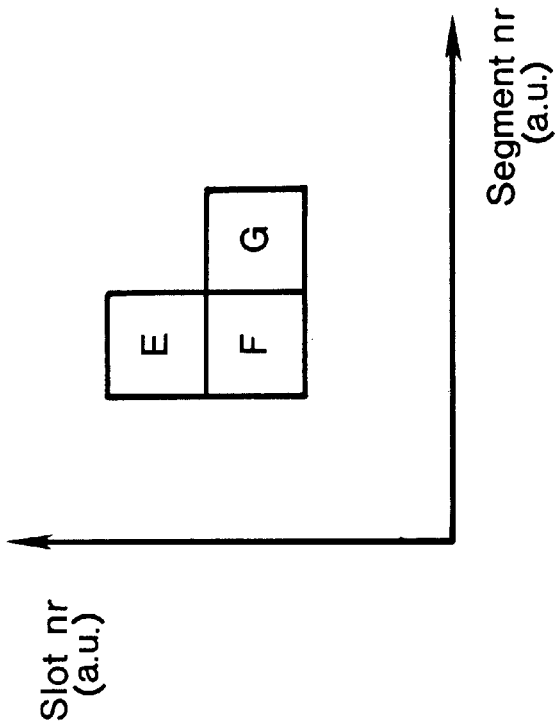
FIG. 25 illustrates a slot-segment map according to the present invention.

It should be pointed out that the resource management method is applicable in all arrangements between the two special cases; a centralized system and a fully distributed system. The number of home nodes can vary between 0 and all nodes connected to the medium. There is also a discussion concerning merging consecutive tokens to "block tokens". It is suggested that merging tokens in the segment domain should be prioritized before merging tokens in the time domain. We give some examples that relates to the included figures in order to illustrate the merging of tokens. In FIG. 23, a token diagram is shown with two time slot consecutive block tokens A and B. In this case the blocks will neither be split nor merged since that would result in shorter segments. In FIG. 24, we show two segment consecutive block tokens, C and D according to the dashed line. Thereafter, the two block tokens C' and D' will be merged into a new token C'D' with a twice as long segment size. The result will be three new block tokens, C", D" and C'D'. In FIG. 25, three block tokens are shown, E, F, G. In this case F and G will merged into a new token FG in order to increase the size of the segment.

Figure 26:
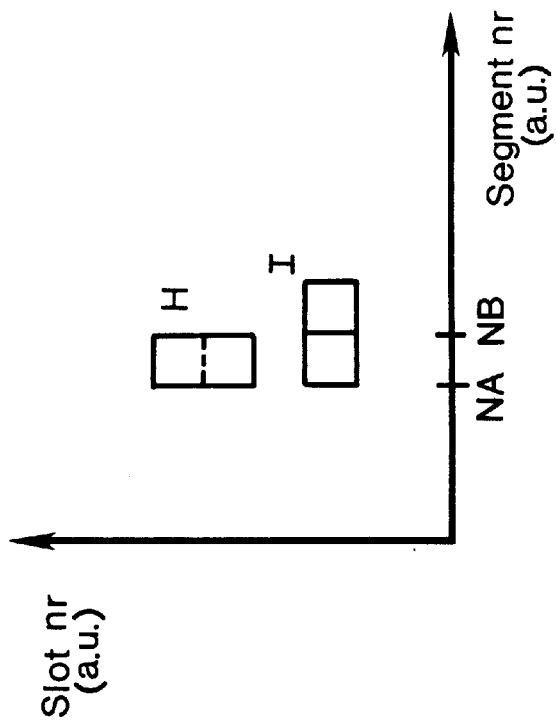
FIG. 26 illustrates a slot-segment map according to the present invention.
Figure 27:
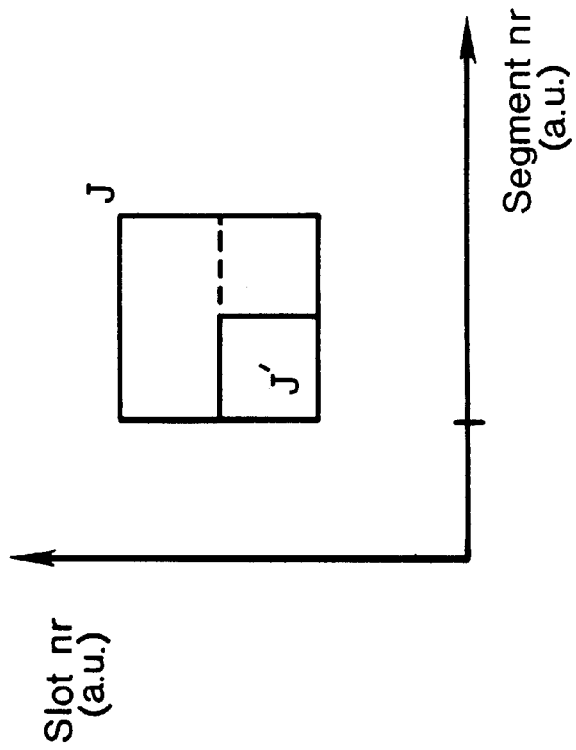
FIG. 27 illustrates a slot-segment map according to the present invention.

In FIG. 26, two block tokens are shown, H and I. The requested capacity corresponds to half the size of H or the complete size of I, and the tokens are to be transferred from node A, NA, to node B, NB. H is chosen, and therefore H is split according to the dashed line. In FIG. 27, a block token, J, is shown. The requested capacity corresponds to half the size of J and the tokens are to be transferred from node A, NA, to node B, NB. Thus, a fragment of J is chosen for the data transfer, and it could either be the upper fragment or the lower fragment (as in FIG. 27) of J that is chosen. The remaining slots will then be split (block tokens are normally rectangular in the time/segment domains). The split is preferably done according to the dashed line to keep the segments as large as possible. It is not required to strictly follow the examples discussed above. In certain cases it may be preferable to prioritize merging in the time slot domain before merging in the segment domain. Normally, the status table contains information about time slots that are available over all segments (i.e., the whole medium). However, it is possible to include even the segment information in the status tables. The result is that more information has to be exchanged between the nodes on the medium.

Figure 28:
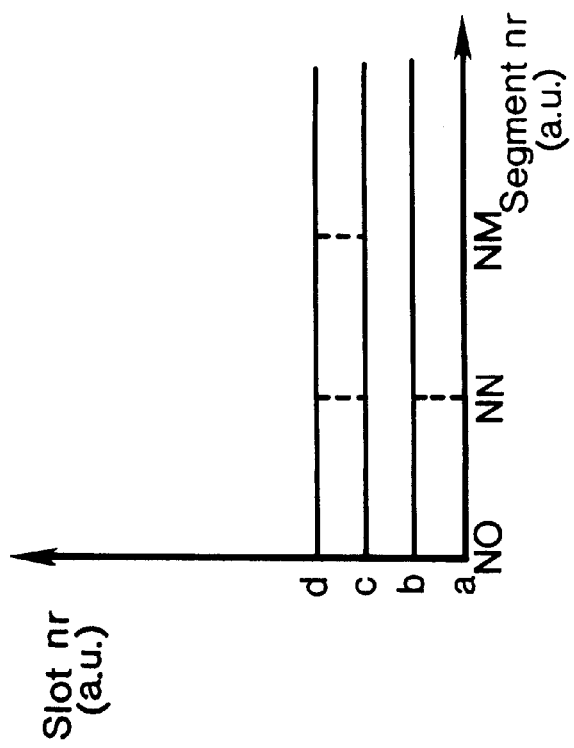
FIG. 28 illustrates a slot-segment map according to the present invention.

Another mechanism that preferably can be implemented, will be described in the following, according to FIG. 28. If node O, NO, has access to the capacity (b-a) over all segments, but is to transfer the capacity (b-a) only to node N, NN, it can make no use of the segment spanning from NN and upstream. The tokens corresponding to that segment can then be included in the token transfer from NO to NN. NN can then use them for potential further transfers.

Correspondingly, if node N, NN, has access to the capacity (time slots) (d-a) and is to transfer the corresponding tokens to node M, NM, it will include the free segments in the token transfer to let NM make use of them in the future. The block token (NO-NN)*(d-c) will be transferred to node O, NO, for its potential future needs. That will require additional signalling which means that the block token (NO-NN)*(d-c) can possibly be transferred with a lower priority.

While the present invention has been described with reference to preferred embodiments, it is to be understood that certain substitutions and alterations may be made thereto without departing from the spirit and scope of the invention as set forth in the appended claims.

We claim:

1. A method for centralizing management of a capacity of a circuit switched network having shared medium topology, the method comprising the steps of:

providing a server node, first node, second node, third node and a fourth node, the nodes having capacities;

providing time slots on a shared medium communication link and a plurality of tokens;

dividing the capacity of the shared medium communication link into cycles;

dividing the cycles into control time slots for signaling and data time slots for transferring data therein;

associating each time slot with a token;

assigning tokens to the server node;

extending a first segment from the first node to the second node, the first segment using a first time slot;

extending a second segment from the third node to the fourth node so that the second segment is disjointed from the first segment, the second segment using the first time slot;

establishing a DTM block format describing the first and second segments;

the server node transferring tokens to the first and third nodes; and simultaneously transmitting information in the first time slot over the first and second disjointed segments.

2. The method according to claim 1 wherein the circuit switched network has a shared ring topology.

3. The method according to claim 1 wherein the circuit switched network has a shared bus topology.

4. The method according to claim 1 wherein the method further comprises implementing the method in a digital synchronous transmission network.

5. The method according to claim 1 wherein the nodes are disposed upstream and downstream of the server node and the server node comprises about one third of the nodes disposed upstream thereof and two-thirds of the nodes disposed downstream thereof.

6. A method for centralizing management of a capacity of a circuit switched network having shared medium topology, the method comprising:

providing a server node and a second node, the server node and the second node having capacities;

providing unidirectionally flowing time slots on a shared medium communication link and providing a plurality of tokens;

dividing the capacity of the shared medium communication link into cycles;

dividing the cycles into control time slots for signaling and data time slots for transferring data therein;

associating each time slot with a token;

assigning tokens to the server node that corresponds to all unidirectionally flowing time slots on the shared medium communication link so that the server node has a free capacity available;

the second node requesting tokens corresponding to a requested capacity from the server node; and the server node reserving and transferring the requested tokens to the second node if the requested capacity is less than the free capacity available of the server node; and transferring tokens back to the server node and releasing the tokens if the data time slots of the server node are idle and no longer used for transferring data.

7. The method according to claim 6 wherein the step of transferring the requested tokens to the second node further comprises transferring the tokens back to the server node and releasing the tokens if the data time slots of the server node are idle for a significant time.

8. A method for distributing management of a capacity of a circuit switched network having shared medium topology, the method comprising:

providing at least two server nodes and a first node, second node, third node and fourth node, the nodes having capacities;

providing time slots on a shared communication link;

dividing the capacity of shared medium communication link into cycles;

dividing the cycles into control time slots for signaling and data time slots for transferring data therein;

providing a plurality of tokens, each token providing exclusive access to each time slot;

associating each time slot with a token;

assigning a first set of tokens to the first node and a second set of tokens to the second node, a third set of tokens to the third node and a fourth set of tokens to the fourth node that correspond to all time slots on the shared medium communication link;

extending a first segment from the first node to the second node, the first segment using a first time slot;

extending a second segment from the third node to the fourth node so that the second segment is disjointed from the first segment, the second segment using the first time slot;

establishing a DTM block format describing the first and second segments; and simultaneously transmitting in the first time slot over the first and second disjointed segments.

9. The method according to claim 8 wherein the method further comprises implementing the method in a digital synchronous transmission network.

10. The method according to claim 8 wherein the method further comprises providing a plurality of serves nodes, the first node requesting token from the plurality of server nodes and the plurality of server nodes reserving tokens requested by the first node so that the reserved tokens together correspond to the requested capacity and transferring the requested tokens to the first node if the free capacities available of server nodes are greater than the requested capacity.

11. The method according to claim 8 wherein the method further comprises using the requested tokens to set up channels and sending a channel set-up message to data-receiving nodes if a token requesting node has obtained tokens that correspond to the requested capacity.

12. The method according to claim 8 wherein at least one server node reserves and transfers tokens that correspond to all the free capacities of the server nodes to the token requesting node if the total free capacity of the server nodes is less than the requested capacity.

13. The method according to claim 12 wherein the method further comprises obtaining tokens and requesting node requesting additional tokens if the tokens obtained are less than the requested capacity.

14. The method according to claim 13 wherein the method further comprises releasing the tokens obtained if the tokens obtained are less than the requested capacity.

15. The method according to claim 13 wherein the method further comprises using the tokens obtained for setting up a channel by sending a channel set-up message to a data receiving node if the data receiving node has free capacity available that is less than the requested capacity.

16. The method according to claim 13 wherein the method further comprises the server node regularly sending out information to the other nodes about the free capacity available of the server node and the other nodes storing the information received from the server node in a status table.

17. The method according to claim 16 wherein the method further comprises finding a server node from which capacity is requested by referring to the status table.

18. The method according to claim 13 wherein one of the server nodes is located closest to the requesting node and the first node request tokens from the server node that is located closest to the requesting node and has a free capacity available that is greater than the requested capacity.

19. The method according to claim 8 wherein no tokens are transferred by the server nodes to the first node if the requested capacity is greater than a free total capacity of the server nodes added together.

20. The method according to claim 8 wherein one of the server nodes has the largest amount of free capacity available and the first node requests tokens from the server node having the largest amount of free capacity available.

21. The method according to claim 8 wherein the method further comprises defining all the nodes of the network with shared medium topology as server nodes and assigning at least one token to each server node.

22. The method according to claim 21 wherein all the nodes of the network with shared medium topology are assigned the same amount of tokens.

23. The method according to claim 8 wherein the method further comprises representing consecutive tokens in a node by a block token and including a number of tokens in the block token.

24. The method according to claim 8 wherein the method further comprises dividing a token into at least two tokens that refer to the same time slot but different segments of the transmission medium that connects at least two nodes.

25. A method for distributing management of a capacity of a circuit switched network having shared medium topology, the method comprising:

providing a plurality of tokens;

providing at least two server nodes and a second node, the server nodes and the second node having capacities;

providing unidirectionally flowing time slots on a shared communication link;

dividing the capacity of shared medium communication link into cycles;

dividing the cycles into control time slots for signaling and data time slots for transferring data therein;

associating each time slot with a token;

assigning tokens to the server nodes that correspond to all unidirectionally flowing time slots on the shared medium communication link so that the server nodes have free capacities available;

the second node requesting tokens corresponding to a requested capacity from at least one of the server nodes; and one of the server nodes reserving and transferring the requested tokens to the second node if the free capacity available of the server node is greater than the requested capacity; and providing a home node and returning the tokens, that have been transferred from one of the server nodes to a second node, to the home node and releasing the tokens when the corresponding time slots are idle and no longer used for data transmission.

26. The method according to claim 25 wherein the method further comprises releasing the token that have been transmitted when the corresponding time slots are idle and no longer used for data transmission.

27. The method according to claim 25 wherein the method further comprises returning the transferred tokens to the home node if the corresponding time slots have been idle for a specific amount of time.

28. The method according to claim 25 wherein the method further comprises the server node reserving and transmitting tokens that derive from a smallest group of time slot consecutive or segment consecutive tokens that fulfills the requested capacity if the server node has several time slot or segment consecutive groups of tokens available to choose from and wherein the smallest group is defined as the group having the smallest product of the number of time slots times the number of segments.

29. The method according to claim 28 wherein the method further comprises providing a group of tokens that are at least partially segment consecutive and reorganizing the group of tokens to maximize a number of consecutive segments per group of tokens and reducing a number of consecutive time slots per group of tokens.

30. A node controller disposed in a node of a circuit-switched network having shared medium topology, comprising:

the circuit-switched network having a capacity that is divided into control time slots for signaling and data time slots used for transferring data;

each data time slot being assigned to each token so that a specific data time slot is only write-accessible by the token assigned to the specific data time slot, each token being usable for at least two cycles of information;

a plurality of tokens associated with the node controller when the tokens correspond to a predetermined number of data time slots disposed in a bus topology;

the node controller being configured to reserve and transfer tokens from a first node to another node controller disposed in fifth node if the fifth node has a free capacity that is greater than a capacity requested by the first node;

a first segment extending from the first node to a second node, the first segment using a first time slot;

a second segment extending from a third node to a fourth node so that the second segment is disjointed from the first segment, the second segment using the first time slot;

an extended DTM format token format describing the first and second segments; and the first node being arranged to reserve a first block token capacity only on the first segment and the third node being arranged to reserve a second block token capacity only on the second segment to permit a simultaneous transmission in the first time slot over the first and second disjoint segments.

31. The node controller of claim 30 wherein the data time slots are disposed in a ring topology.

32. The node controller of claim 30 wherein the circuit-switched network is based on a digital synchronous transmission network.

33. A server node disposed in a circuit-switched network having shared medium topology, comprising:

the network having a capacity that is divided into cycles and the cycles being divided into control time slots adapted for signaling and data time slots adapted for transferring data;

each data time slot being assigned to each token so that a specific data time slot is only write-accessible by the token assigned to the specific data time slot;

the node controller being assigned a predetermined number of tokens of data time slots of a bus structure, the predetermined tokens being usable for more than one cycle of information by the node controller; and the node controller being configured to reserve and transfer tokens to another capacity requesting node controller disposed in another node if the free capacity available of the node controller is greater than the requested capacity of the other node controller;

a first segment extending from a first node to a second node, the first segment using the first time slot;

a second segment extending from a third node to a fourth node so that the second segment is disjointed from the first segment, the second segment using the second time slot;

an extended DTM format token format describing the first and second segments; and the server node being arranged to reserve a first block token capacity only on the first segment and the server node being arranged to reserve a second block token capacity only on the second segment to permit a simultaneous transmission in the first time slot over the first and second disjoint segments.

34. The server node according to claim 33 wherein the network is based on digital synchronous transmission network.

35. The server node according to claim 33 wherein the assigned number of tokens correspond to all unidirectionally flowing data time slots in a bus topology.

36. The server node according to claim 33 wherein the assigned number of tokens correspond to all unidirectionally flowing data time slots in a ring topology.

37. The server node according to claim 33 wherein the server node has one third of a total number of nodes on an upstream side of the server node and two thirds of the total number of the nodes on a downstream side of the server node.

38. A circuit-switched network having a shared medium topology, comprising:

the network having a capacity that is divided into cycles and the cycles being divided into control time slots adapted for signaling and data time slots adapted for transferring data;

each data time slot being assigned to each token so that a specific data time slot is only accessible by the token assigned to the specific data time slot;

a server node assigned to tokens according to a predetermined number of data time slots disposed in a bus topology, the predetermined number of data time slots being usable for more than one cycle of information by the server node, the server node being configured to reserve and transfer tokens to another node if tokens are requested by the other node and if the other node has a free capacity available that is greater than a capacity requested by the server node;

a first segment extending from a first node to a second node, the first segment using a first time slot;

a second segment extending from a third node to a fourth node so that the second segment is disjointed from the first segment, the second segment using the first time slot;

an extended DTM format token format describing the first and second segments; and the server node being arranged to reserve a first block token capacity only on the first segment and the server node being arranged to reserve a second block token capacity only on the second segment to permit a simultaneous transmission in the first time slot over the first and second disjoint segments.

39. The circuit-switched network of claim 38 wherein the data time slots are disposed in a ring topology.

40. The circuit-switched network of claim 38 wherein the data time slots are disposed in a digital synchronous transmission network.

41. A circuit-switched network having a shared medium topology, comprising:

the network having a capacity that is divided into cycles and the cycles being divided into control time slots adapted for transferring data;

each data time slot being assigned to each token so that a specific data time slot is only accessible by the token assigned to the specific data time slot;

a first and second server node being defined, each server node having tokens that are distributed in a bus topology so that the tokens correspond to all data time slots flowing in one direction;

the first and second server nodes being arranged to reserve and transfer tokens to a first node if the server nodes obtain the requested capacity of tokens from the first node and the server nodes have free capacity available that is greater than the requested capacity;

a channel established between at least two server nodes, the channel having specific data time slots assigned thereto, the channel being usable for more than one cycle of information;

a first segment extending from the first node to a second node, the first segment using a first time slot;

a second segment extending from a third node to a fourth node so that the second segment is disjointed from the first segment, the second segment using the first time slot;

an extended DTM format token format describing the first and second segments; and the first server node being arranged to reserve a first block token capacity only on the first segment and the second server node being arranged to reserve a second block token capacity only on the second segment to permit a simultaneous transmission in the first time slot over the first and second disjoint segments.

42. The circuit-switched network according to claim 41 wherein the tokens that are distributed in a ring topology.

43. The circuit-switched network according to claim 42 wherein a channel set-up node is arranged to use tokens to set up a channel by sending a channel set up message to data-receiving nodes if the channel set-up node has obtained tokens that correspond to the requested capacity of the data-receiving node.

44. The circuit-switched network according to claim 41 wherein the network is implemented in a network of digital synchronous transmission.

45. The circuit-switched network according to claim 41 wherein one or more server nodes are arranged to reserve and transfer tokens corresponding to all free capacity available of the server nodes to a requesting node that requests capacity if the server nodes together have a capacity that is less than the requested capacity.

46. The circuit-switched network according to claim 41 wherein one or more server nodes are arranged to terminate transferring any tokens to the requesting node requesting capacity if the server nodes together have a capacity that is less than the requested capacity.

47. The circuit-switched network according to claim 41 wherein a node is arranged to use a status table that is regularly updated to describe unused capacity of the server nodes and the node is arranged to determine from which server node to request tokens.

* * * * *